(12) United States Patent
Liebmann et al.

(10) Patent No.: US 8,103,529 B1
(45) Date of Patent: Jan. 24, 2012

(54) GUARANTEED LONG-LIFE BENEFIT CALCULATOR

(75) Inventors: Jean Barbara Liebmann, Duvall, WA (US); Kevin W. Rabin, Issaquah, WA (US); Edwin Chong, Mill Creek, WA (US)

(73) Assignee: Symetra Life Insurance Company, Bellevue, WA (US)

( * ) Notice: Subject to any disclaimer, the term of this patent is extended or adjusted under 35 U.S.C. 154(b) by 435 days.

(21) Appl. No.: 12/363,616

(22) Filed: Jan. 30, 2009

(51) Int. Cl.
*G06Q 40/00* (2006.01)
(52) U.S. Cl. .......................... 705/4; 705/36 R
(58) Field of Classification Search .................. None
See application file for complete search history.

(56) References Cited

U.S. PATENT DOCUMENTS

| | | | |
|---|---|---|---|
| 5,933,815 A * | 8/1999 | Golden | 705/36 R |
| 7,805,352 B2 | 9/2010 | Mercier | |
| 7,840,469 B2 | 11/2010 | Mercier | |
| 7,853,509 B2 | 12/2010 | Mercier | |
| 7,979,337 B2 | 7/2011 | Mercier | |
| 2002/0194098 A1 * | 12/2002 | Stiff et al. | 705/36 |

* cited by examiner

*Primary Examiner* — Jason M Borlinghaus
(74) *Attorney, Agent, or Firm* — Christensen O'Connor Johnson Kindness PLLC

(57) ABSTRACT

Calculation of rider charges to form a basis for a guaranty to ensure guaranteed long-life benefit (GLLB) payments is made possible by using calculator machinery to analyze interest rates, mortality, expenses, and capital/reserves. These payments are a separate income stream from a pledged asset, which may be withdrawn anytime by a guarantee. Mathematical calculation is provided to reduce the guaranteed long-life benefit (GLLB) payments if not all of the rider charges are paid by the guarantee. For those rider charges that are paid using qualified funds, calculation for required minimum distribution is also possible.

12 Claims, 22 Drawing Sheets

GUARANTEED LONG-LIFE BENEFIT CALCULATOR

BACKGROUND

Today, people are living longer than in the past. For retirees, there is a risk that they may outlive their savings. Conventional methods that accumulate savings include individual retirement accounts, 401(k) plans funded from employee paychecks, and Keogh plans for the self-employed. None of these conventional methods provides an assurance that a retired person's savings will last. Even Social Security, a public program in the U.S. that provides lifetime income upon retirement, may fail to keep pace because of economic uncertainties in the early twenty-first century. A few conventional products, such as annuities, offer periodic payments to a person for the life of the person, but these conventional products require a large, upfront financial commitment, and generally lack liquidity.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the present subject matter includes a method form which recites a method for distributing guaranteed long-life payments. The method comprises using a calculator machinery to calculate rider charges to be charged to a guarantee based on specified guaranteed long-life payments, age, gender, and a deferral period desired by the guarantee. The method further comprises using a payment machinery to print checks or prepare electronic transfers for distributing the guaranteed long-life payments, whose distribution is separate from a distribution of a pledged asset, after a deferral period has passed, rider charges are paid by the guarantee, and the guarantee is still alive.

Another aspect of the present subject matter includes a computer-readable medium form which recites a computer-readable medium having computer-executable instructions stored thereon for implementing a computer-executable method for distributing guaranteed long-life payments. The computer-readable medium comprises using a calculator machinery to calculate rider charges to be charged to a guarantee based on specified guaranteed long-life payments, age, gender, and a deferral period desired by the guarantee. The method further comprises using a payment machinery to print checks or prepare electronic transfers for distributing the guaranteed long-life payments, whose distribution is separate from a distribution of a pledged asset. The act of distributing the guaranteed long-life payments commences after a deferral period has passed, rider charges are paid by the guarantee, and the guarantee is still alive.

A further aspect of the present subject matter includes a system form which recites a system for calculating a required minimum distribution. The system comprises a required minimum distribution calculator configured to calculate a required minimum distribution as a quotient of a dividend and a divisor, the dividend being a fair market value of a deferred payout annuity at year T, and the divisor being a life expectancy for a person with a current age of X. The system further comprises a reduced annuity benefits calculator for calculating reduced annuity benefits if a guarantee requests the required minimum distribution to be taken from the deferred payout annuity.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
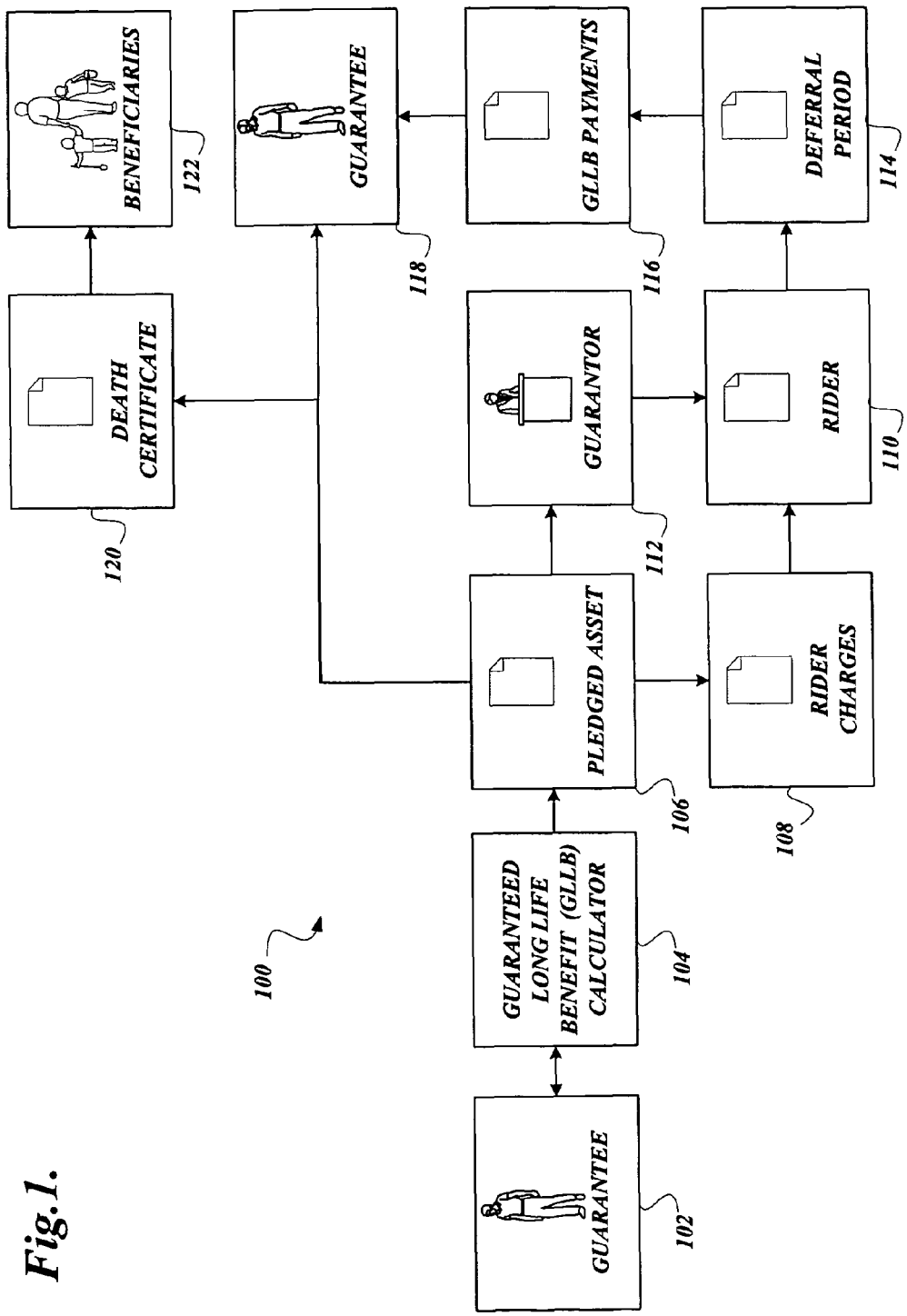
FIG. 1 is a block diagram illustrating an exemplary system for calculating guaranteed long-life payments and their distribution.

For those who are concerned about whether they will outlive their savings, guaranteed long-life benefit (GLLB) payments, as provided by various embodiments of the present subject matter, are one way to obtain fixed income payments for life. Typically, it is less expensive to procure future guaranteed lifetime income now than at a time when one would want income payments to start, especially considering mortality as well as the time value of money. The GLLB payments start at some future date, which can be another source of income in addition to payments made from a pledged asset, in the form of an annuity. A guarantee, who is a recipient of the GLLB payments, chooses a deferral period, after which GLLB payments commence if the guarantee is alive. One suitable deferral interval includes 5-year increments, but others are possible. One suitable minimum deferral period is 15 years, but others are possible. One suitable maximum deferral period is 35 years, but others are possible. A suitable maximum age to start receiving GLLB payments is 95 years of age, but others are possible. A suitable age range within which a guarantee may purchase a rider based on which GLLB payments are made includes ages between 50 and 75 years old, but others are possible. The guarantee also specifies the GLLB payment amount at the time the rider is purchased. A suitable minimum GLLB payment is $500 per month, but others are possible. The price or cost (rider charges) of procuring the GLLB payments in the future depends on calculating factors such as the guarantee's age and sex, the deferral period, the desired GLLB monthly payment amount, and so on. Suitably, the rider charges are taken over a period of time and remain the same over a period of time, such as ten anniversaries starting from the time of purchasing the rider, but other periods of time may be used. As indicated earlier, in various embodiments of the subject matter, the GLLB payments to the guarantee are separate from and in addition to any other retirement streams of income, such as annuities and Social Security. Suitable limits may be placed on the GLLB payments. One suitable limit includes reducing the future amount of GLLB payments upon the present withdrawal of the entire pledged asset or annuitization of the pledged asset prior to the expiry of a period of time to collect the rider charges, such as the conclusion of ten anniversaries starting from the time of procuring the GLLB payments. A further suitable limit includes the inability to cancel the rider once procured by the guarantee. A further suitable limit includes a cash valuation of zero for the rider, and hence no death benefit that can be transferable.

Conventional methods that accumulate savings may be subject to market volatility, which may cause the potential loss of a pledged asset. In contrast, various embodiments of the present subject matter allow the guarantee to purchase future GLLB payments that are not affected by market volatility. In fact, withdrawals from an asset pledged in connection with a GLLB do not impact (such as to cause a reduction) future GLLB payments as long as the rider charges are paid. One suitable limitation includes an inability by the guarantor to increase the rider charges.

Components of a system 100 for calculating and distributing guaranteed long-life benefit payments are illustrated at FIG. 1. Some of these components can be implemented in software, hardware, or a combination of both. For example, a payment machinery is used to print guaranteed long-life benefit payments in check form to be distributed. Some of the components are a computer-storable medium, computer-readable medium, or both. A guarantee 102 uses a guaranteed long-life benefit (GLLB) calculator 104 to determine the cost (rider charges) of obtaining guaranteed long-life payments 116. Based on a pledged asset 106, among other factors, a guarantor 112, such as an insurance company, issues a rider 110 (or a guaranty), which guarantees the guaranteed long-life payments 116 to the guarantee 102.

The cost (or price) of procuring the rider 110 (or the guaranty) by the guarantee consists of the rider charges 108. The guarantee 102 pays the rider charges 108 over a predetermined period of time, such as over 10 years at an anniversary of each of the 10 years, under the issued rider 110 to ensure the guaranteed long-life payments 116. After a deferral period 114, which is specified by the guarantee 102, has passed, the guaranteed long-life payments 116 are distributed to a guarantee 118. The guarantee 118 represents a personhood that is identical to the guarantee 102, albeit an older guarantee 102. If the guarantee 118 has passed away, the distribution of the guaranteed long-life payments 116 cease, and the remaining pledged asset 106 is distributed to the beneficiaries 122 of the guarantee 118 upon presentation of a death certificate 120.

Figure 2:
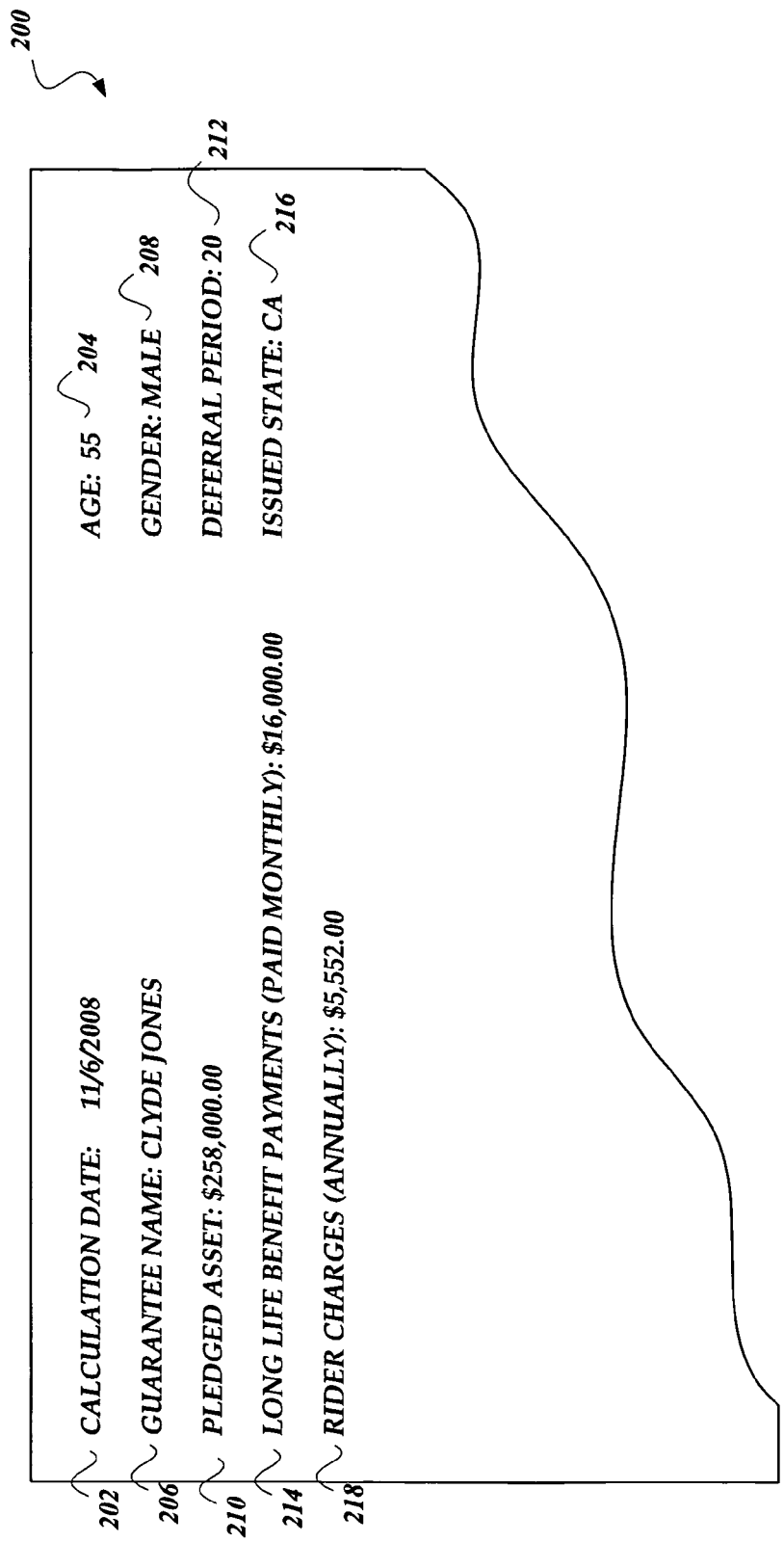
FIG. 2 is a pictorial diagram illustrating an exemplary user interface, in accordance with one embodiment of the present subject matter.

A user interface 200 illustrates one out of a number of user interface screens connected with the guaranteed long-life benefit (GLLB) calculator 104. See FIG. 2. The GLLB calculator 104, in one embodiment, can be accessed via the World Wide Web at a particular Uniform Resource Locator, such as www.symetra.com/GLLB. The GLLB calculator 104, in another embodiment, includes pieces of software executing on a piece of hardware, such as a computing machine, including a hand-held computing device. The GLLB calculator 104, in a third embodiment, includes a piece of hardware, such as hardwired circuitry or calculator machinery, that emulates the piece of software discussed above. The GLLB calculator 104 allows entry of the guarantee's name, state, age, desired future GLLB payments, and desired deferral period. The guarantee, through the GLLB calculator 104, may specify various income scenarios using different withdrawal amounts and periods and different desired levels of GLLB payments. Graphs and other presentations are available to compare the costs of purchasing the rider against conventional retirement products.

The user interface 200 allows the guarantee 102 to enter various pieces of information to allow the guaranteed long-life benefit calculator 104 to calculate the rider charges 108 to procure the guaranteed long-life payments 116. Among the pieces of information that can be entered into the user interface 200 include a calculation date 202, which shows Nov. 6, 2008, for illustrative purposes. The guarantee 102 may also enter his age at user interface field 204 which shows the age of 55 for illustrative purposes. The age of the guarantee 102 affects the rider charges to be calculated. The guarantee name is provided at user interface field 206, in which, for illustrative purposes, "Clyde Jones" is entered. The gender of the guarantee 102 is entered at a user interface field 208, which, for illustrative purposes, "male" is entered. The gender of the guarantee 102 may affect the rider charges 108 to be calculated.

At a user interface field 210, the pledged asset 106 is entered by the guarantee 102 in which, for illustrative purposes, "$258,000" is entered. At a user interface field 212, the deferral period 114 is entered and, for illustrative purposes, 20 years is entered by the guarantee 102. The deferral period affects the rider charges to be calculated. The desired guaranteed long-life benefit payments, which are paid monthly or other suitable time period, are entered at a user interface field 214, in which, for illustrative purposes, "$16,000" is entered. The desired guaranteed long-life benefit payments affect the rider charges to be calculated. The rider charges 108 may also be affected depending on the state in which the rider 110 is issued. The state of issuance of the rider 110 is entered by the guarantee 102 at a user interface field 216, in which, for illustrative purposes, the abbreviation "CA" for the state of California is entered. The rider charges to the guarantee 102, which are to be paid annually or other suitable time period, are calculated by the guaranteed long-life benefit calculator 104 and are presented to the guarantee 102 at a user interface field 218, which in this case for illustrative purposes, "$5,552" is displayed.

Figure 3:
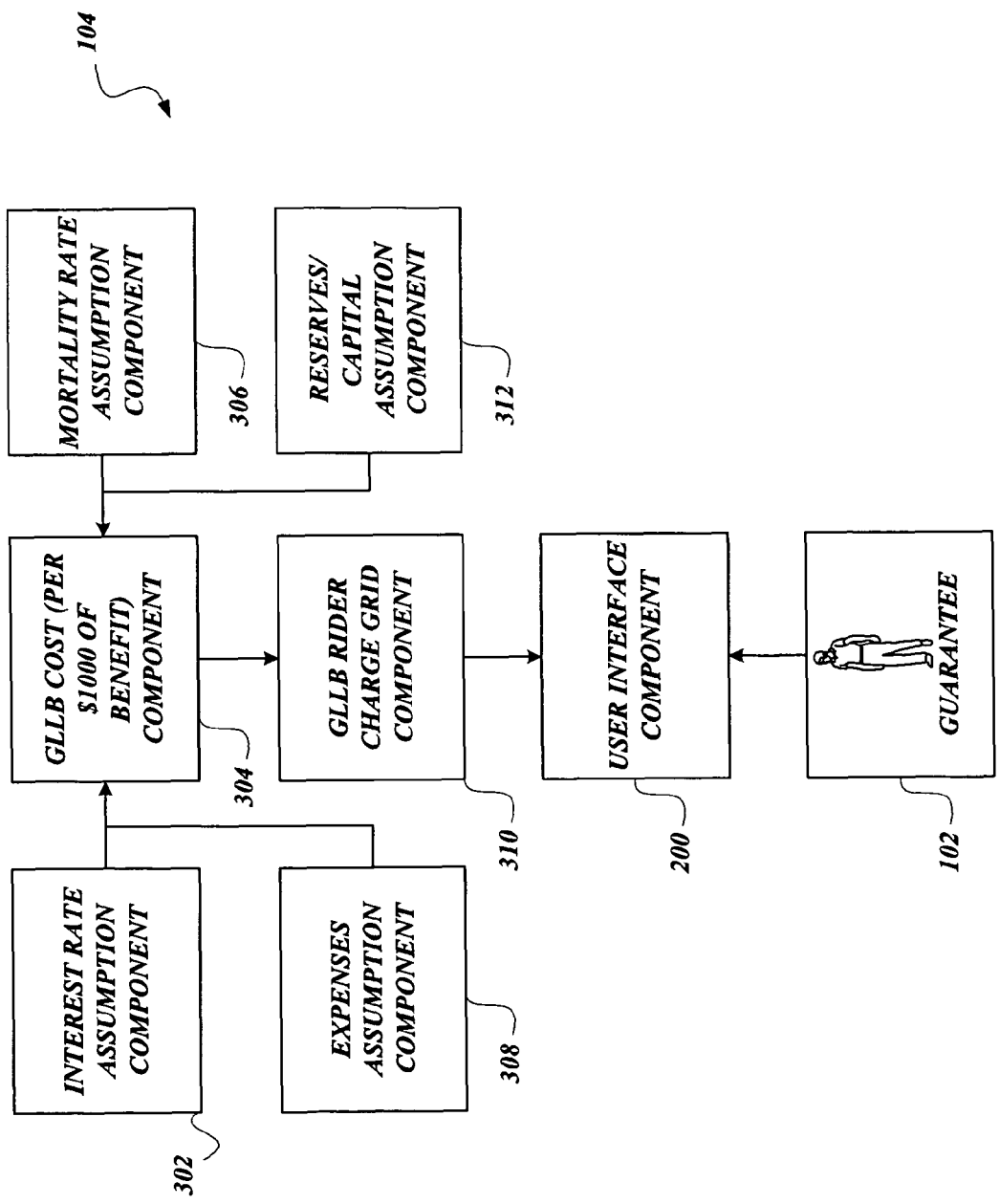
FIG. 3 is a block diagram illustrating an exemplary calculator for calculating guaranteed long-life payments, in accordance with one embodiment of the present subject matter.

Several components of the guaranteed long-life benefit calculator 104 are illustrated in detail at FIG. 3. To calculate the rider charges 108 for the guarantee 102 and presenting such rider charges to the user interface 200, the guaranteed long-life benefit calculator 104 includes an interest rate assumption component 302 that performs various interest rate calculations to help calculate the rider charges 108. An expenses assumption component 308 is configured to calculate expenses in connection with setting up, maintaining, and distributing the guaranteed long-life payments 116 to the guarantee 118. A mortality rate assumption component 306 calculates actuarial values based on mortality statistics connected with the guarantee 102. A reserves/capital assumption component 312 calculates economic conditions, both internal and external, to the business of the guarantor 112. The results of components 302, 306, 308, and 312 are fed into a GLLB cost (per $1000 of benefit) component 304 to calculate the cost of providing the guaranteed long-life benefits to the guarantee 102. A GLLB rider charge grid component 310 integrates the result from the GLLB cost component 304 to present the total rider charges 108 to the guarantee 102 to consider.

Figure 4:
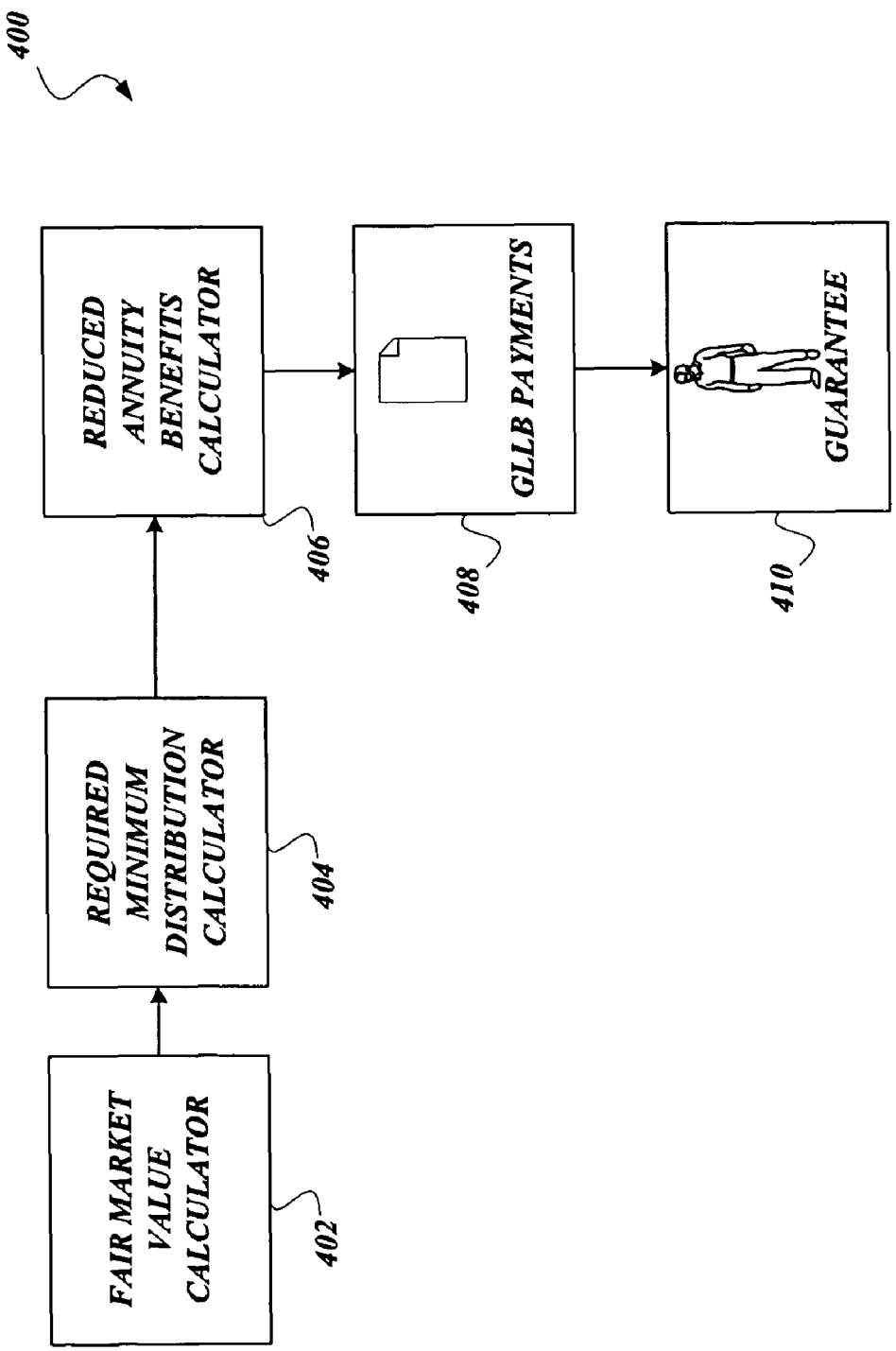
FIG. 4 is a block diagram illustrating a system for calculating a required minimum distribution, in accordance with one embodiment of the present subject matter.

A system 400 for calculating a required minimum distribution to a guarantee 410 is illustrated in FIG. 4. In circumstances where the guarantee 410 pledges assets that qualify for various tax benefits under certain provisions of the Internal Revenue Code, after a certain age is reached, such as 70½ years of age, a required minimum distribution must be made to the guarantee 410. The issue is that before GLLB payments commence the code's required minimum distribution must be met, while maintain pricing parity for those not taking and/or demanding required minimum distribution. Various embodiments of the present subject matter are configured to calculate a solution to resolve or lessen the conflict. The system 400 includes several components to calculate the required minimum distribution. One component is a fair market value calculator 402, which estimates the fair market value of the rider 110, which as discussed before has no cash value. Another component is a required minimum distribution calculator 404 that calculates a required minimum distribution. A third component is a reduced annuity benefits calculator 406. From these components, required minimum distributions are paid to the guarantee 410 and GLLB payments 408 are reduced, allowing the required minimum distribution requirements of the Internal Revenue Code to be met.

Figure 5A:
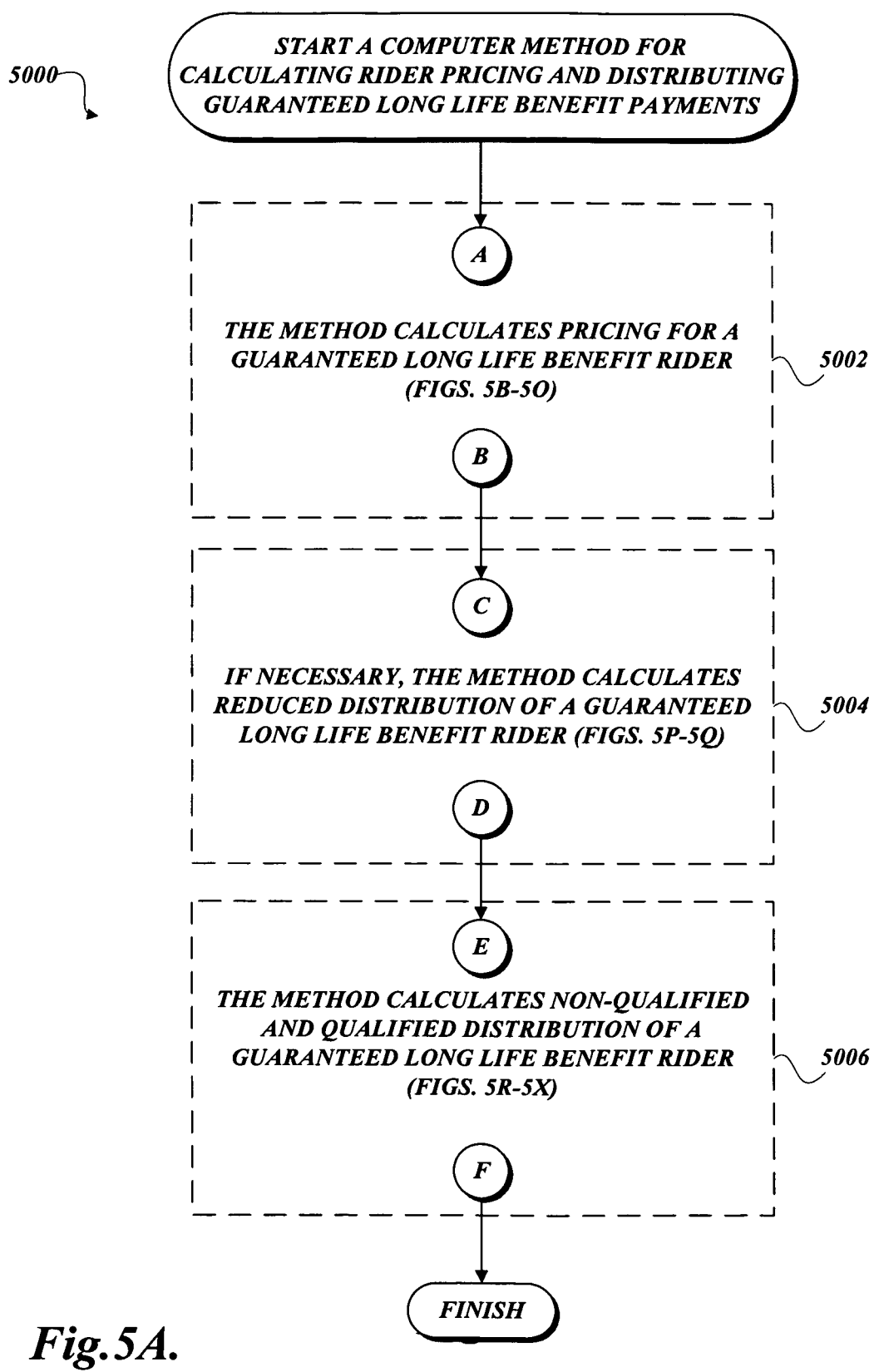
FIGS. 5A-5I and 5P-5X are process diagrams illustrating an exemplary method for calculating, pricing, and distributing guaranteed long-life benefit payments.
Figure 5B:
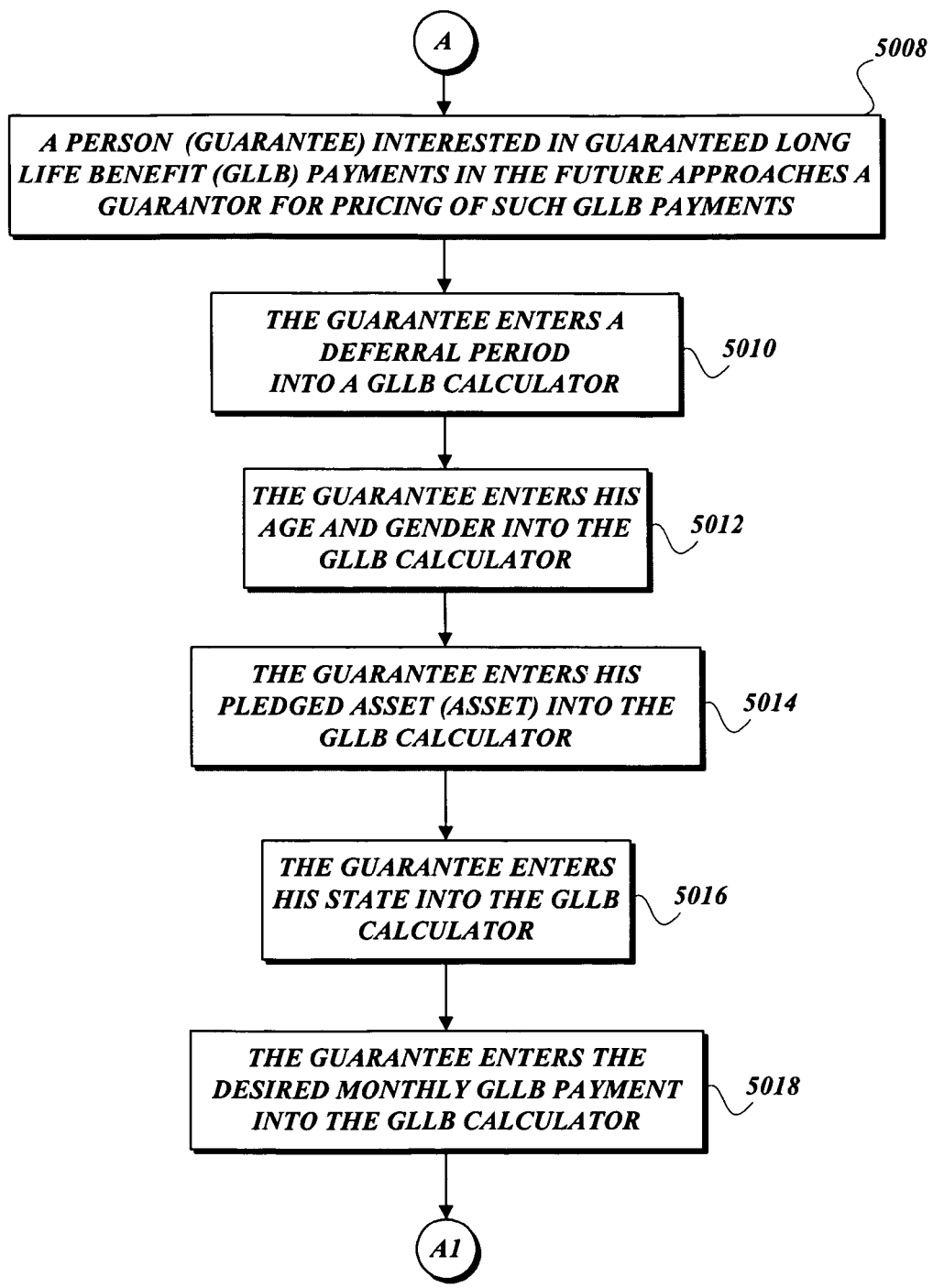
Figure 5C:
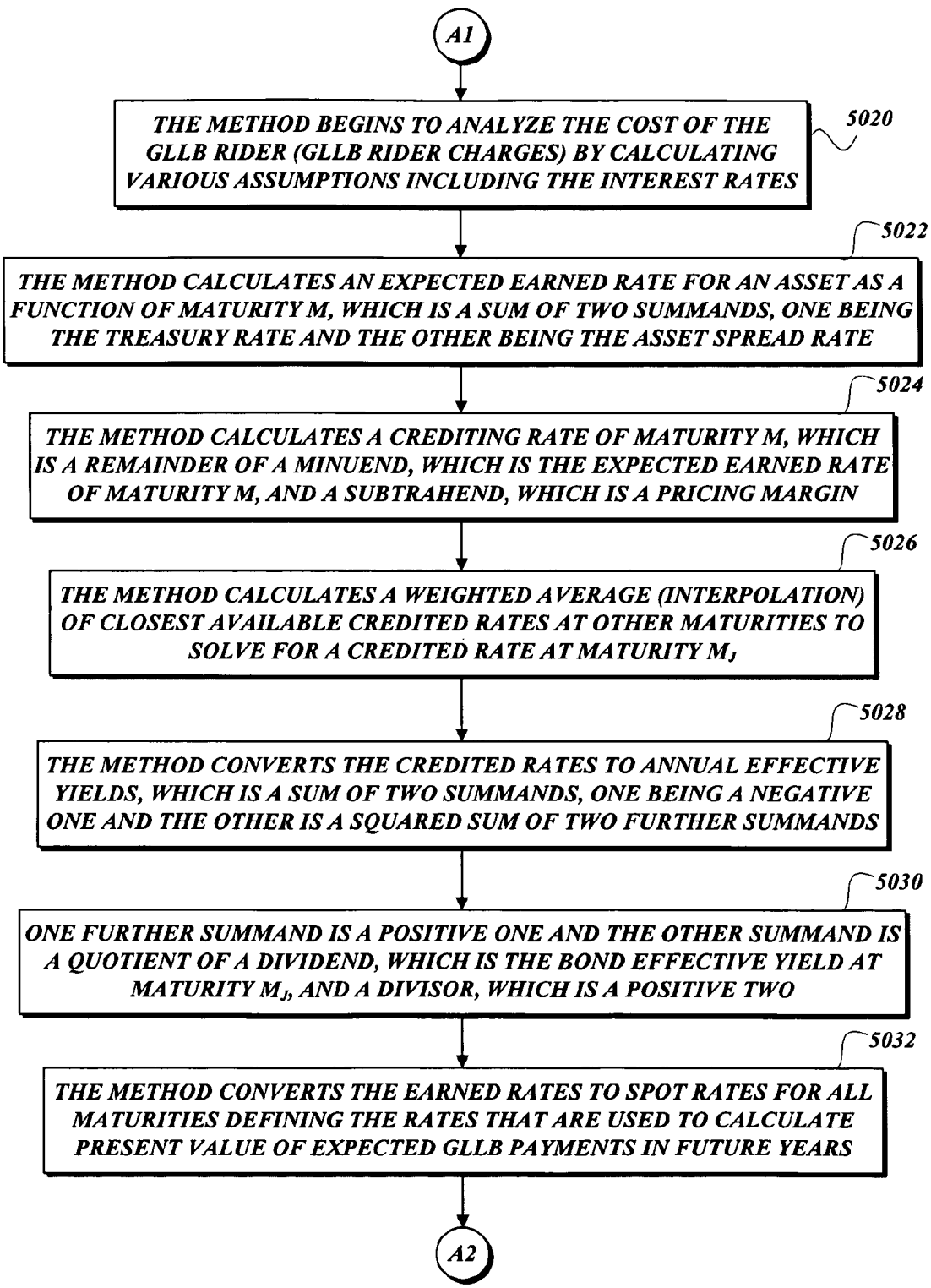
Figure 5D:
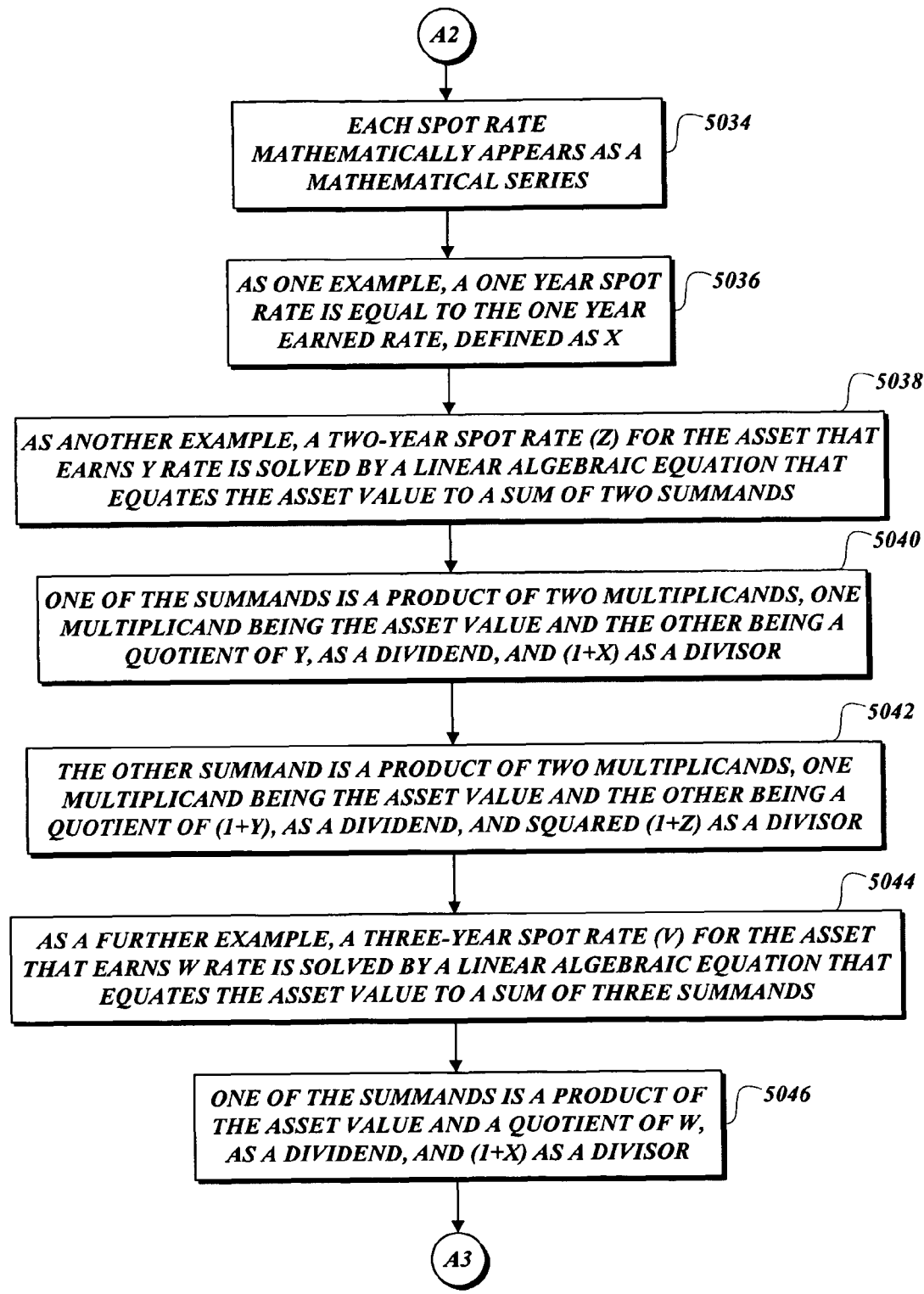
Figure 5E:
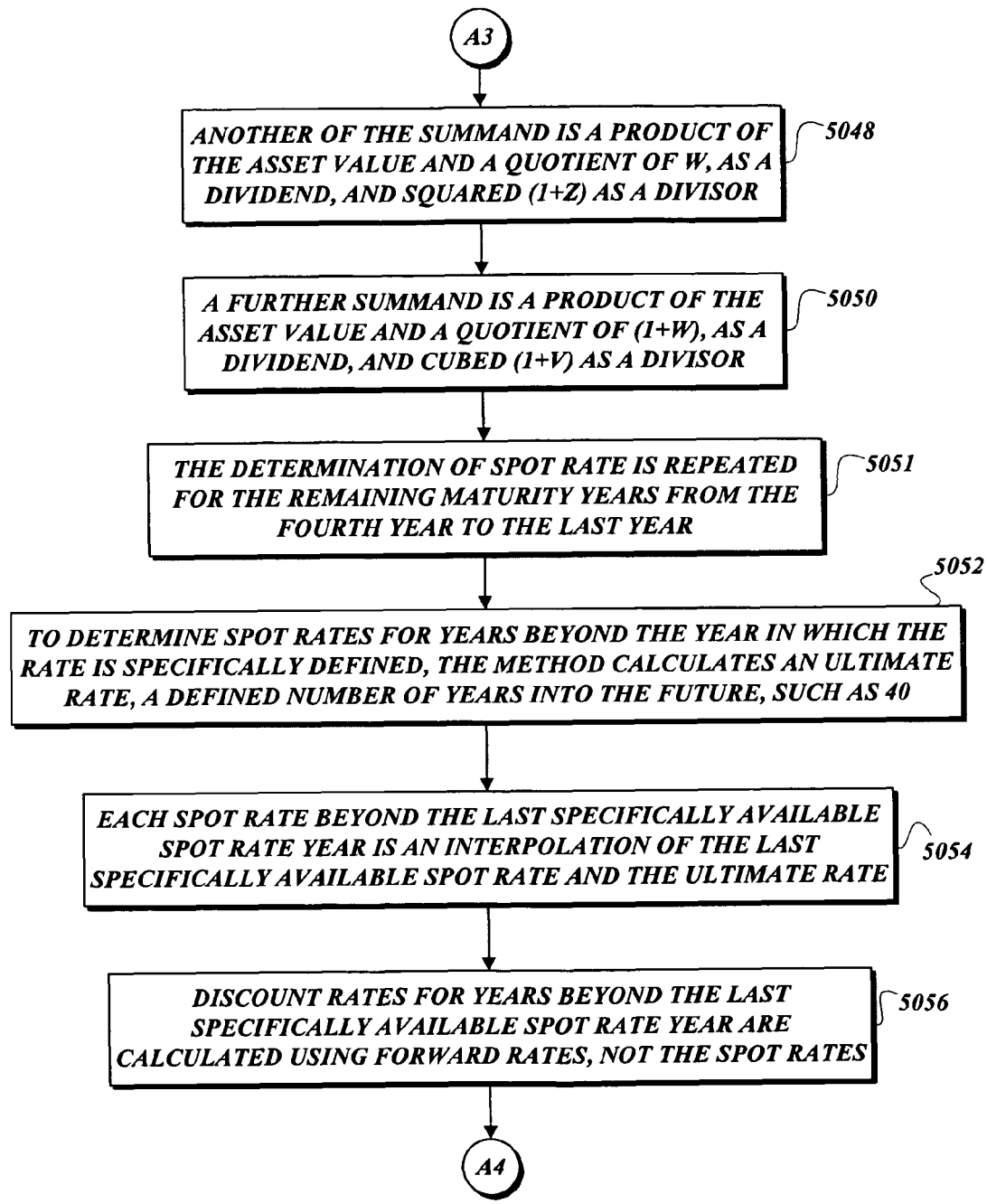
Figure 5F:
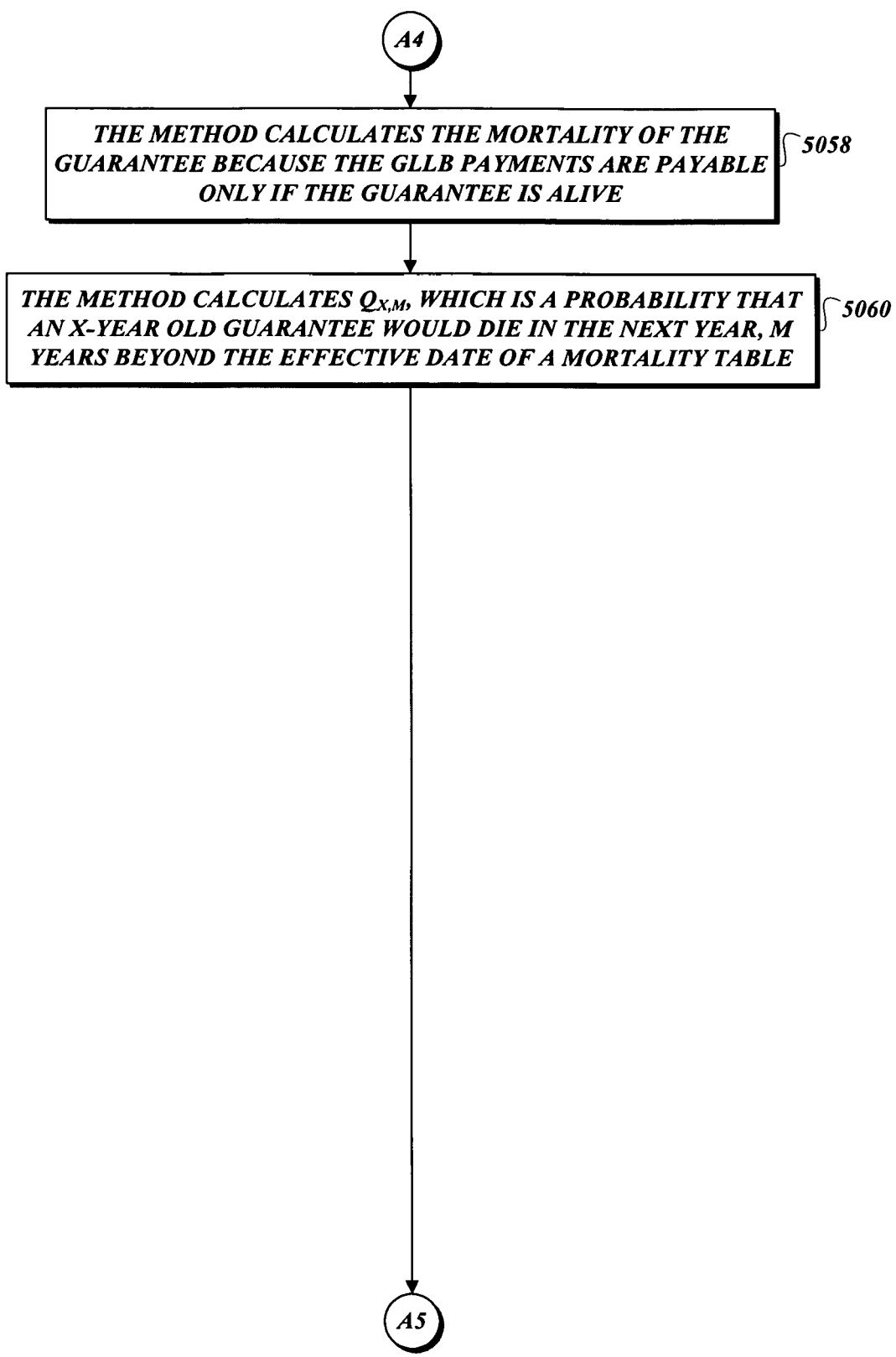
Figure 5G:
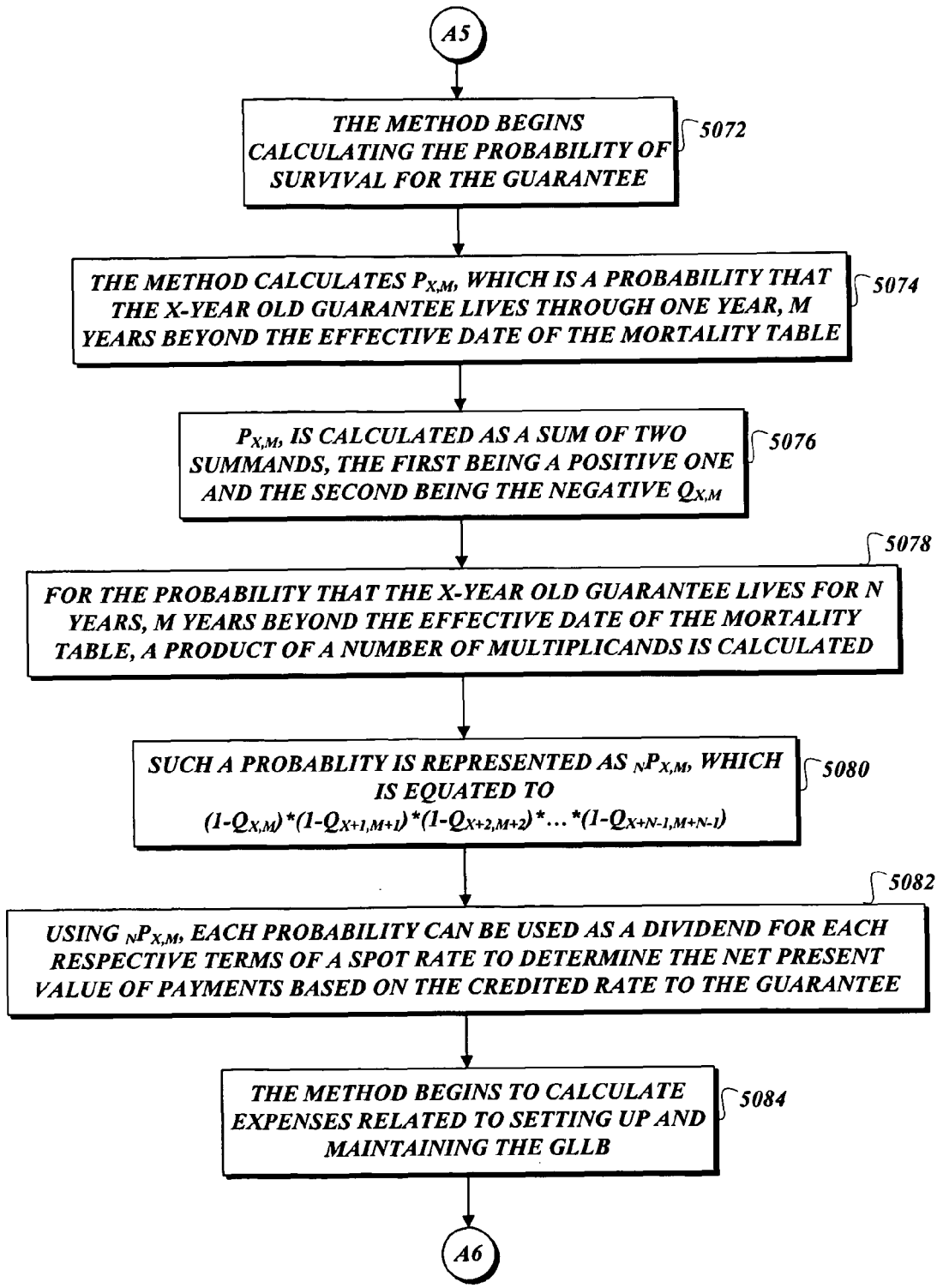
Figure 5H:
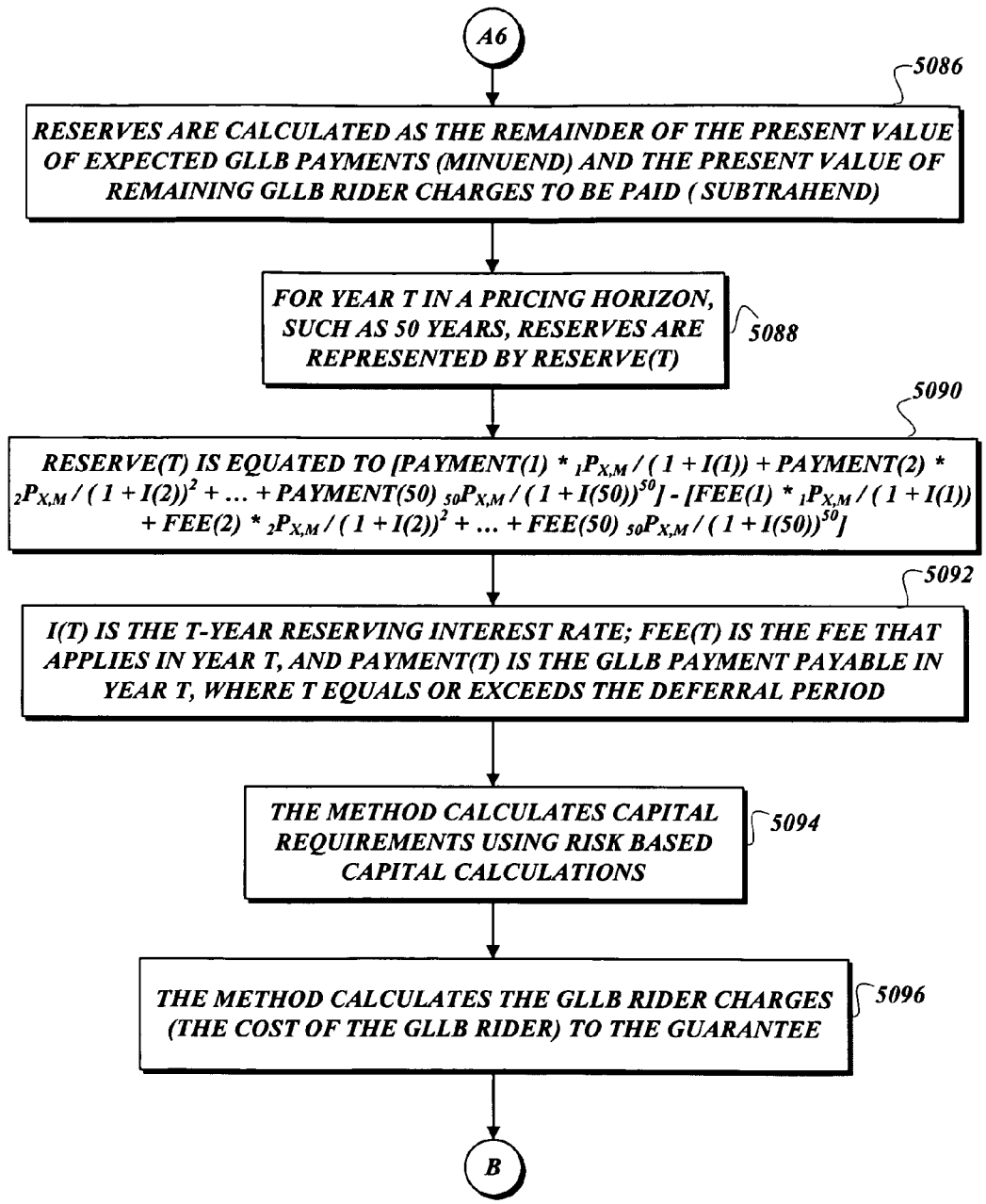
Figure 5I:
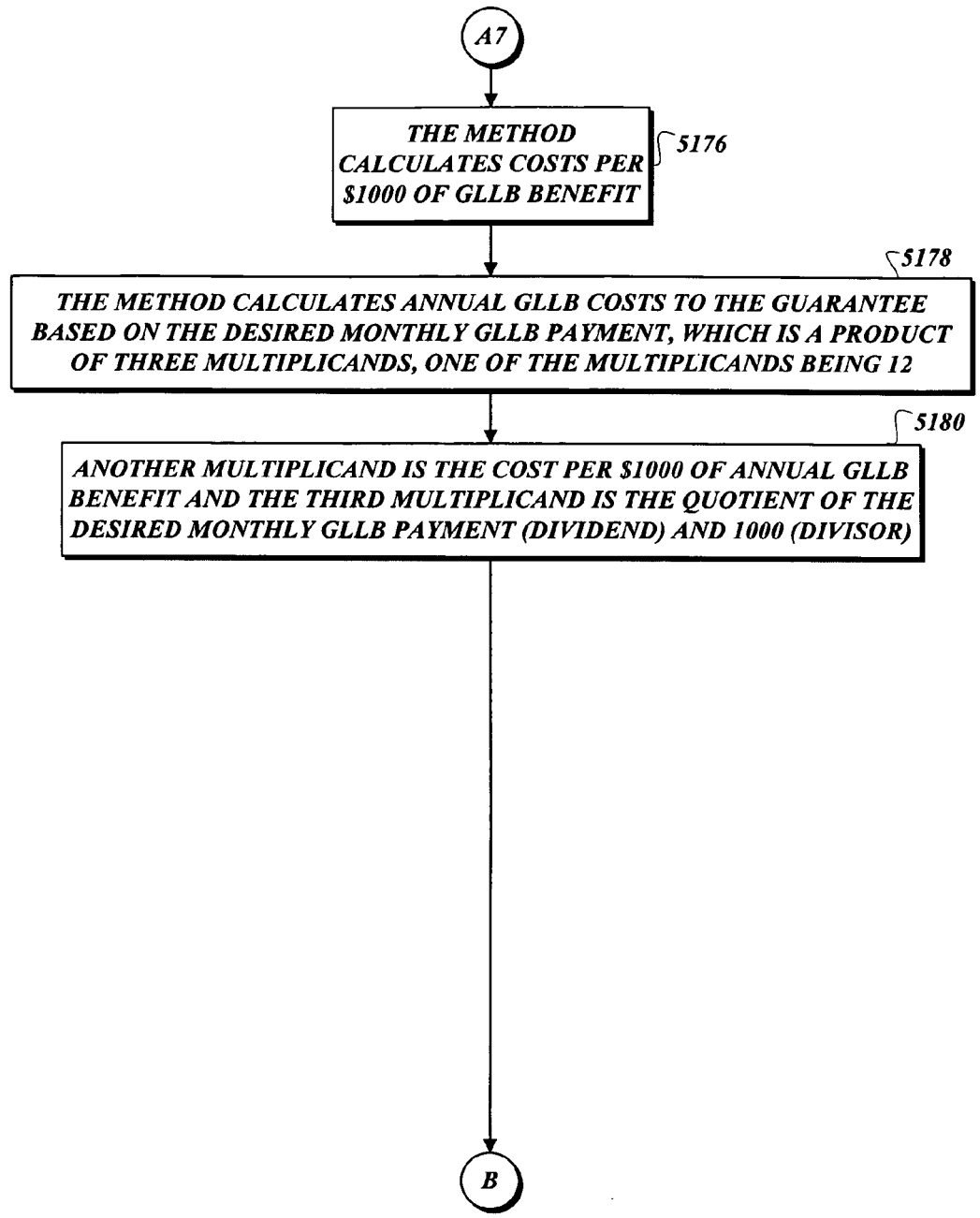
Figure 5P:
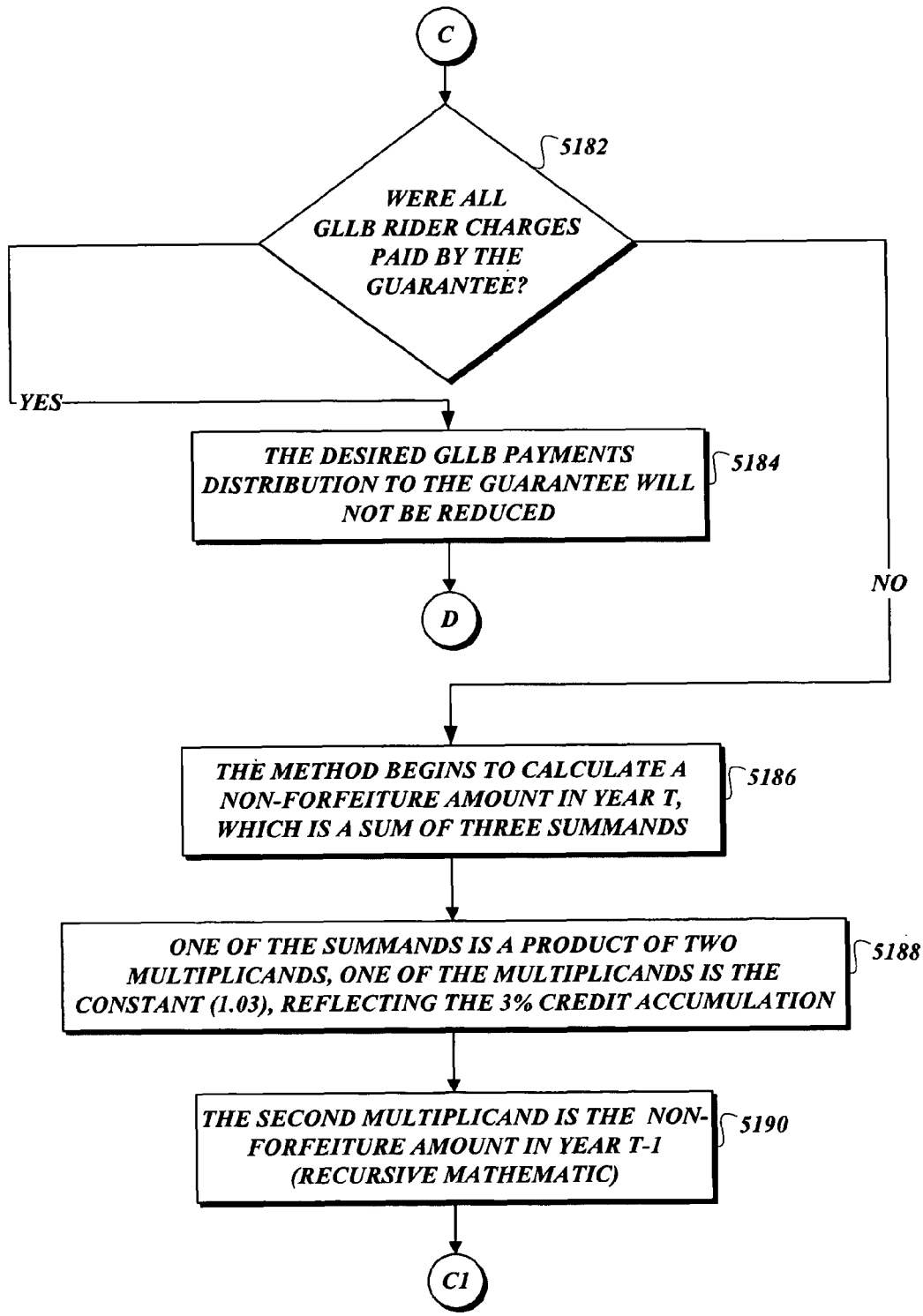
Figure 5Q:
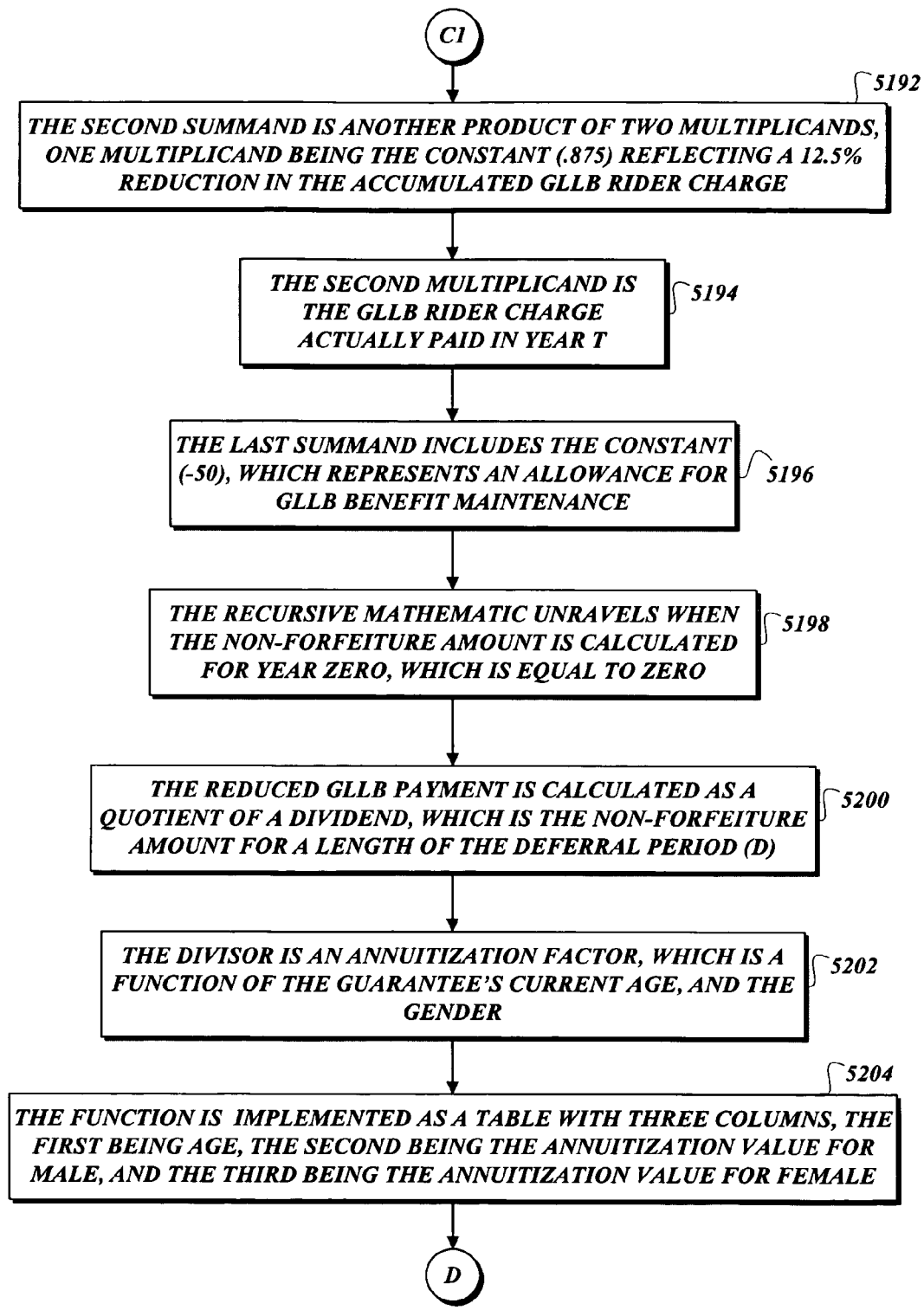
Figure 5R:
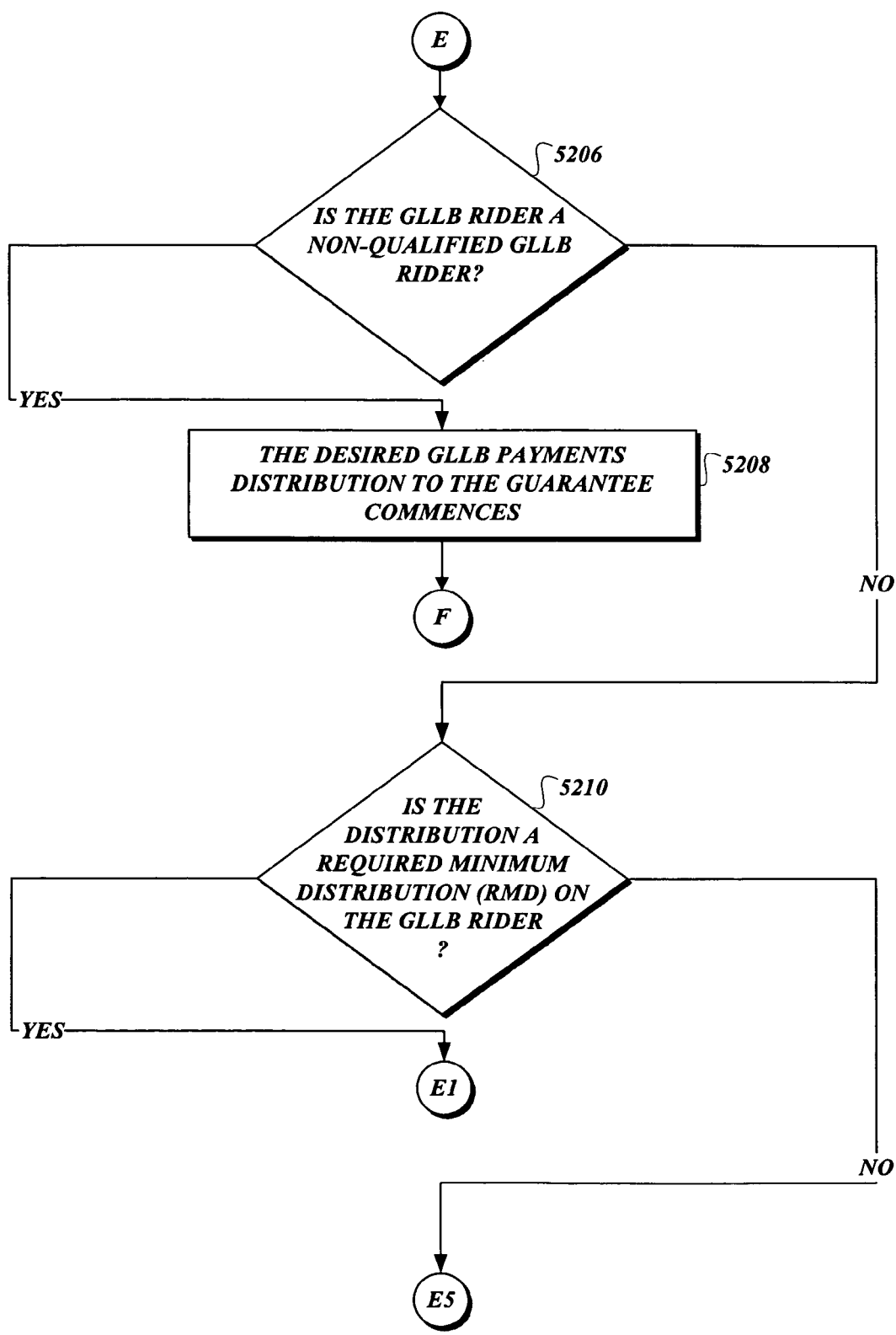
Figure 5S:
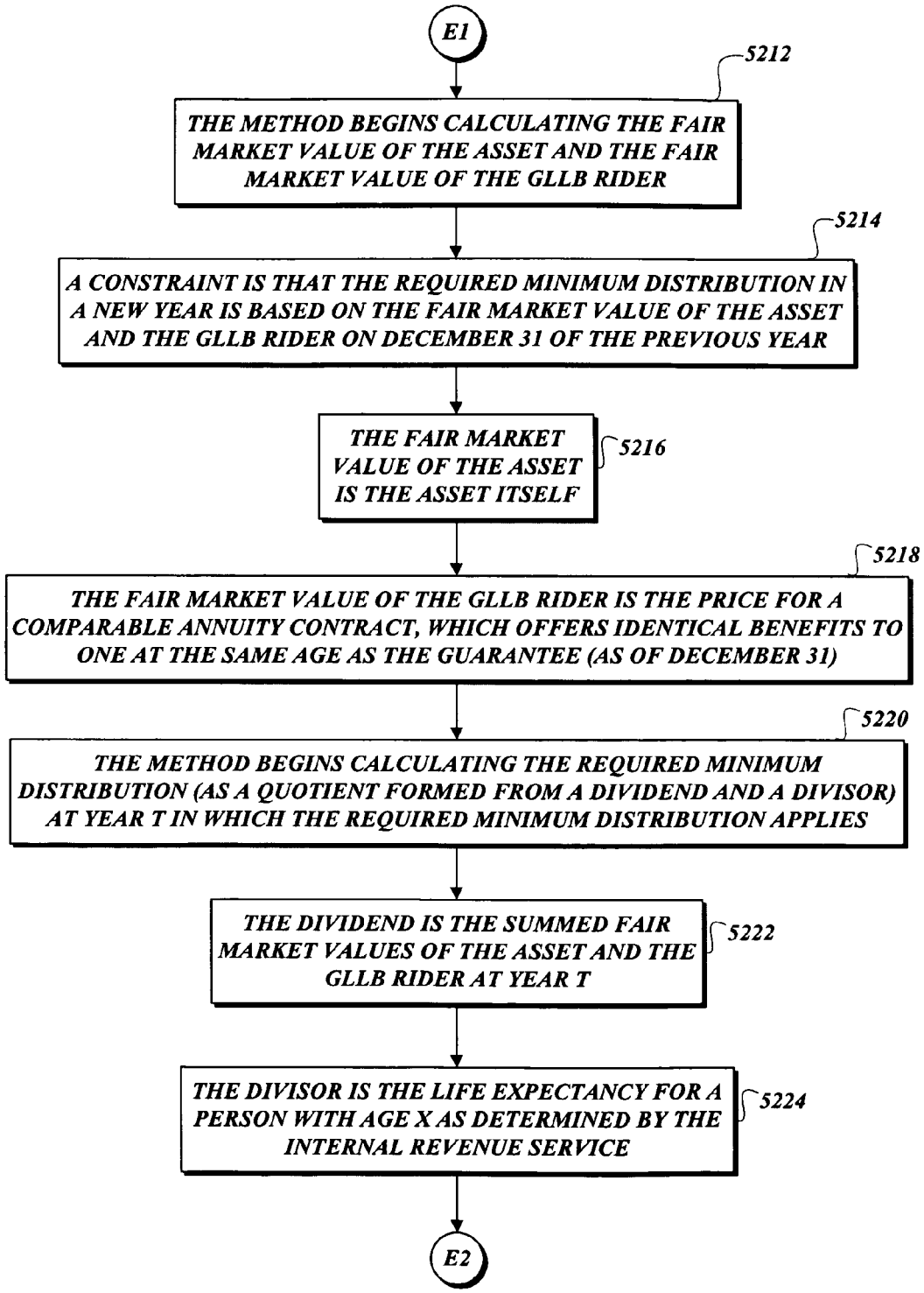
Figure 5T:
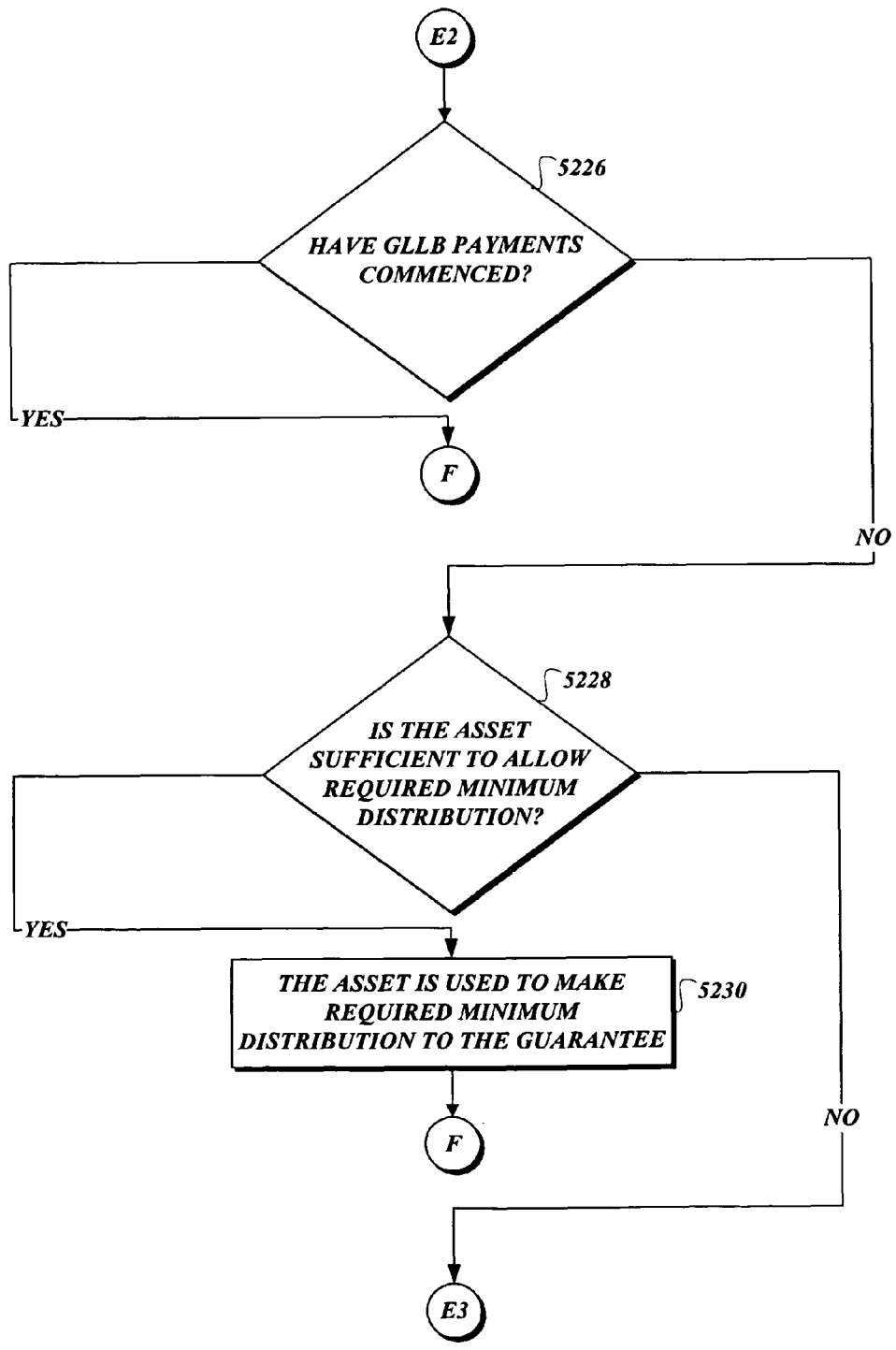
Figure 5U:
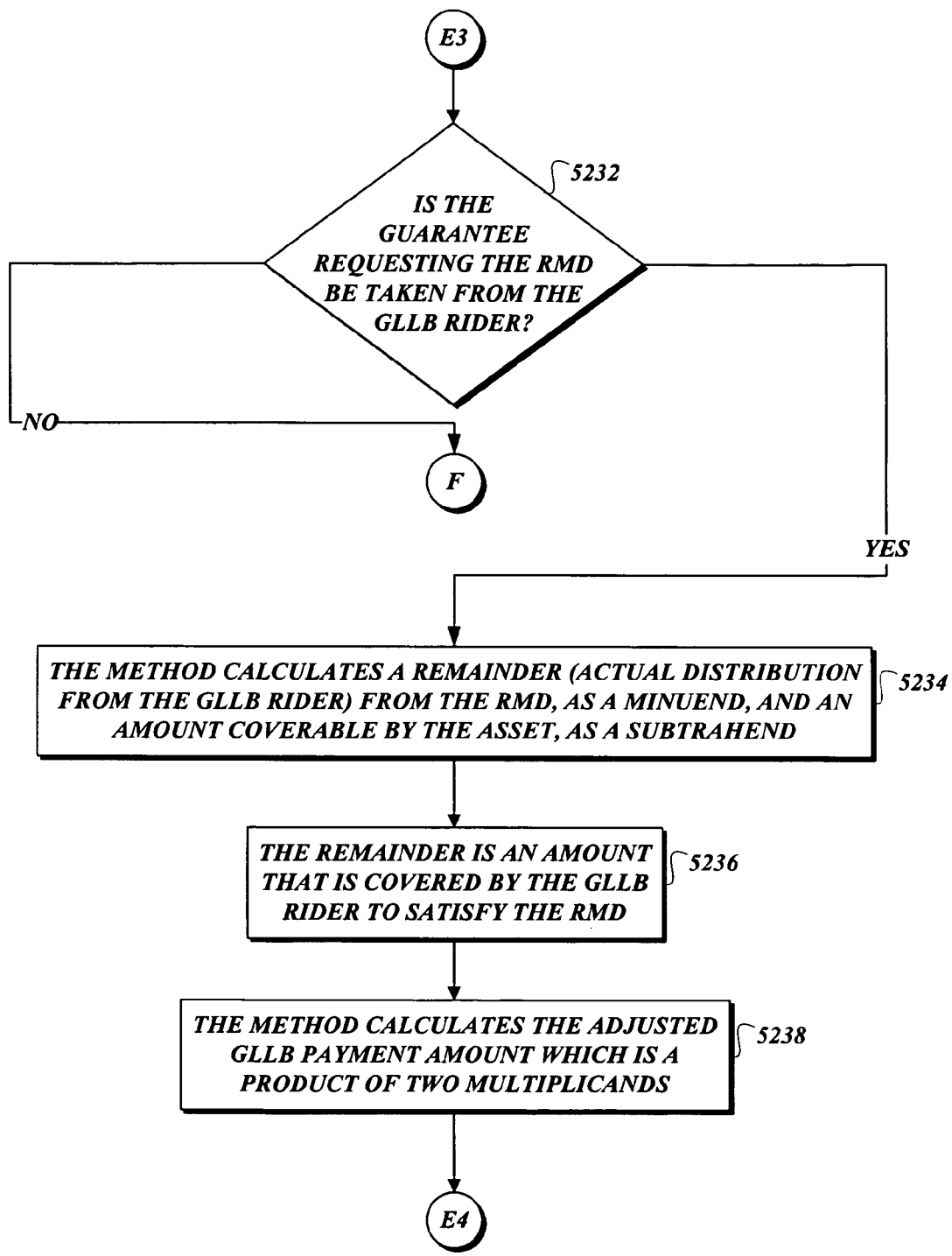
Figure 5V:
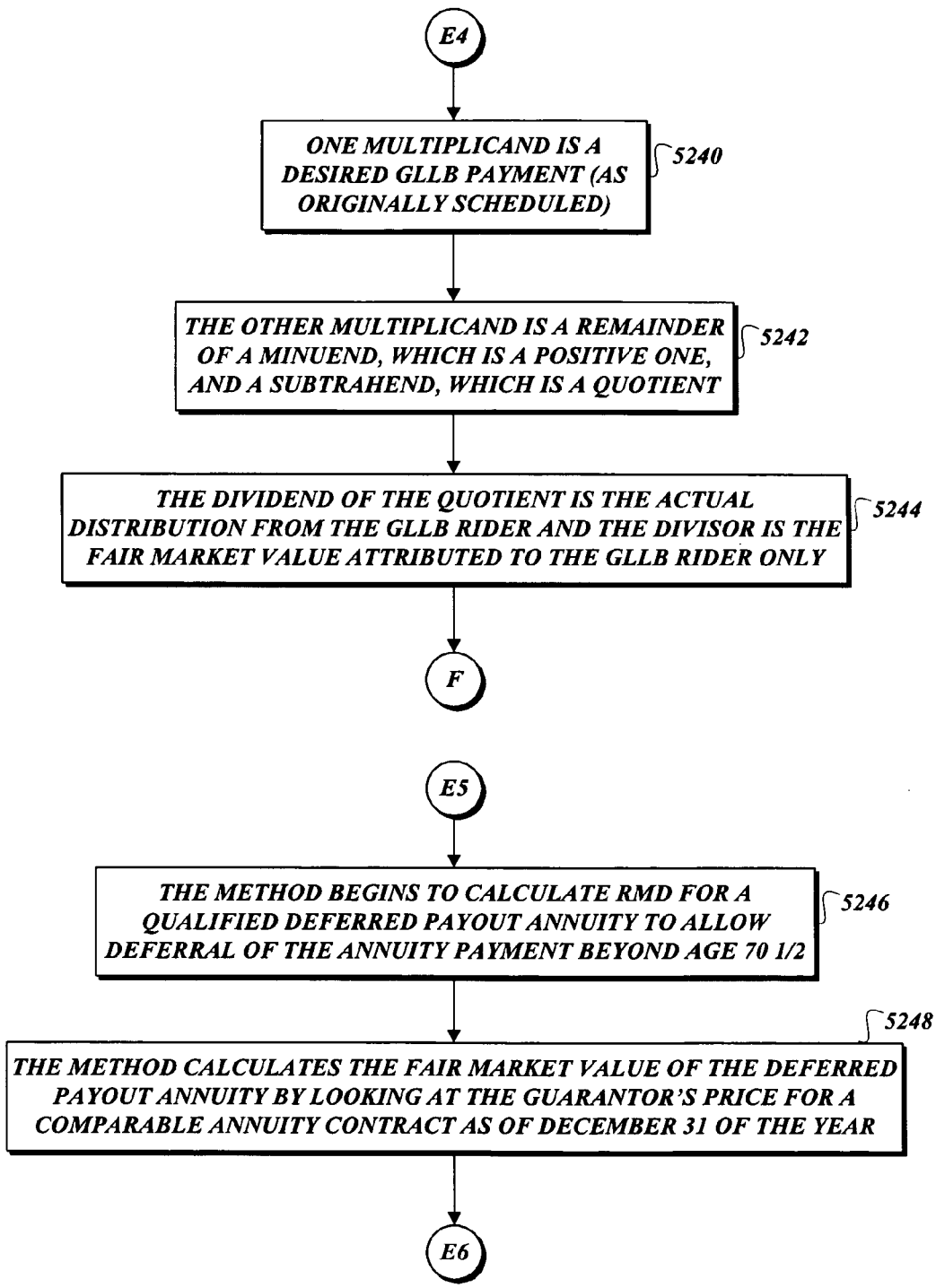
Figure 5W:
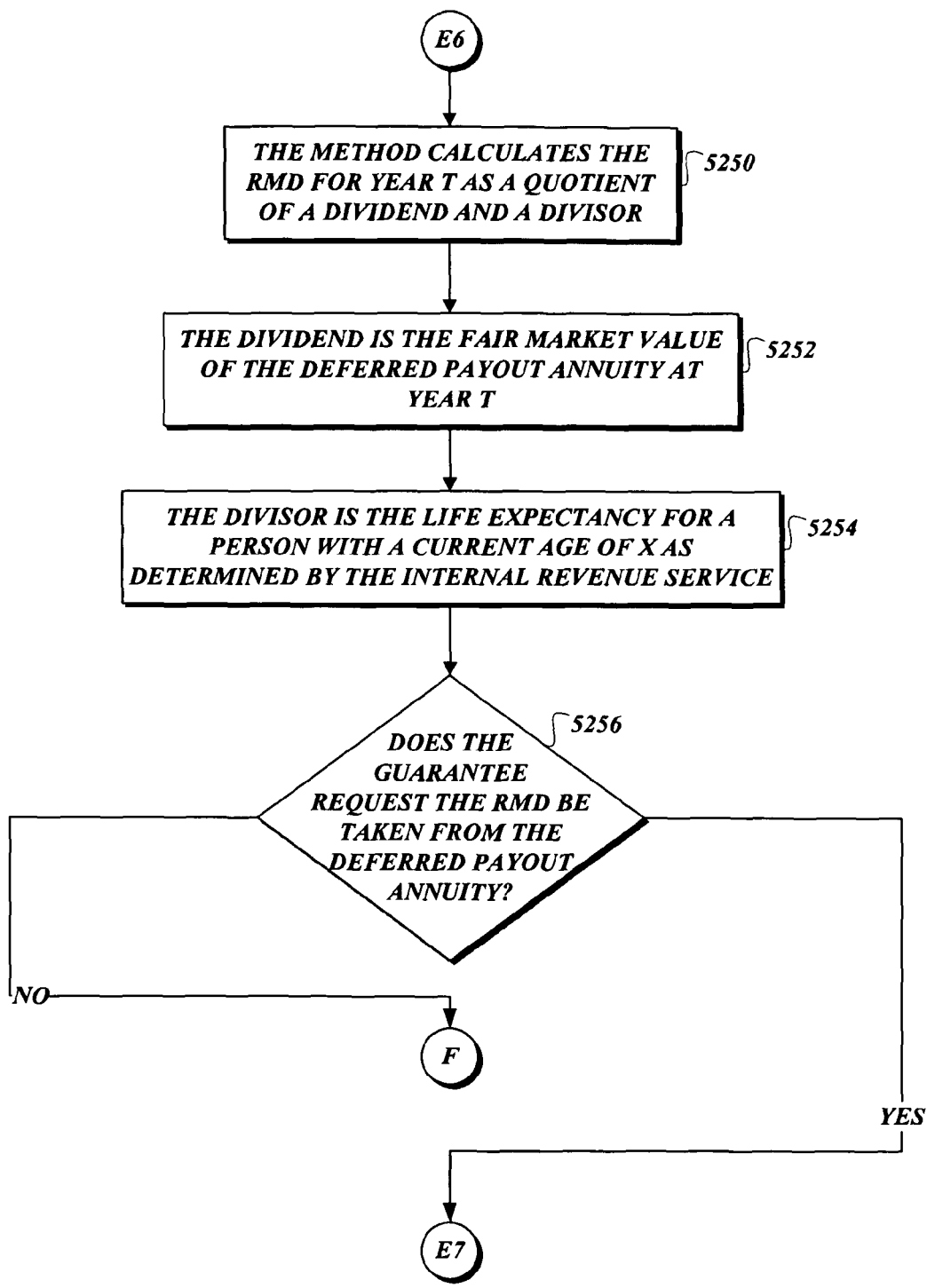
Figure 5X:
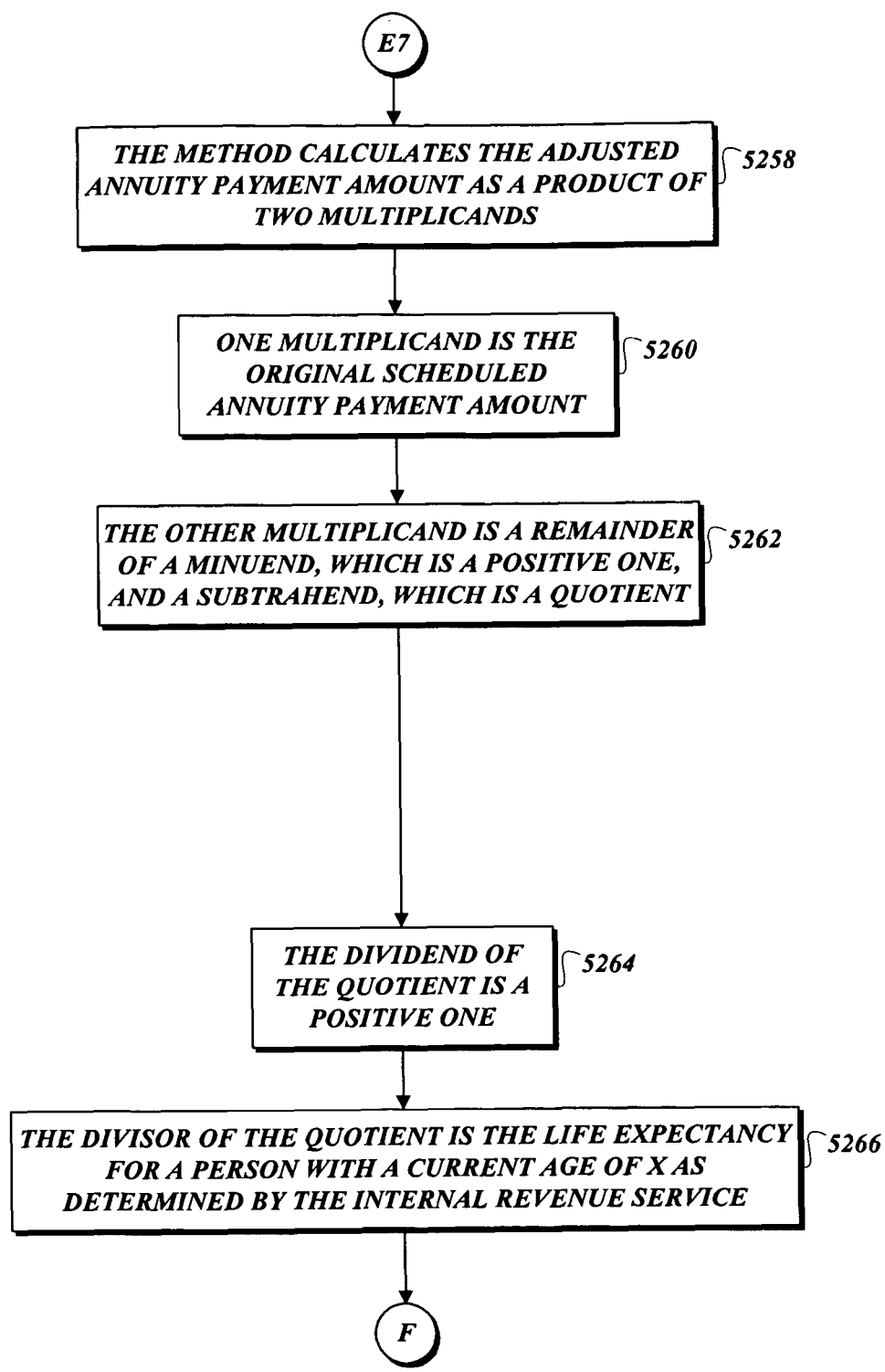

FIGS. 5A-5X illustrate a method 5000 for calculating rider charges (pricing) and distributing guaranteed long-life benefit payments to the guarantee. From a start block, the method 5000 proceeds to a set of method steps, defined between a continuation terminal ("Terminal A") and an exit terminal ("Terminal B"). The set of method steps 5002 describes the calculation of pricing for a guaranteed long-life benefit rider.

From Terminal A (FIG. 5B), the method 5000 proceeds to block 5008 where a person (guarantee) interested in guaranteed long-life benefit (GLLB) payments in the future approaches a guarantor via a GLLB calculator for pricing of such GLLB payments. At block 5010, the guarantee enters a deferral period into the GLLB calculator. The guarantee also enters his age and gender into the GLLB calculator. See block 5012. Next, at block 5014, the guarantee enters his pledged asset into the GLLB calculator. The guarantee then enters his state of issuance into the GLLB calculator. See block 5016. Proceeding to block 5018, the guarantee enters the desired monthly GLLB payments into the GLLB calculator. The method 5000 then proceeds to another continuation terminal ("Terminal A1").

From Terminal A1 (FIG. 5C), the method begins to analyze the cost of the GLLB rider (rider charges) by calculating various assumptions including the interest rates. This allows eventual calculation of a present value of future GLLB payments to the guarantee. See block 5020. Interest rates are used to discount future expected benefits to an earlier date. In the case of GLLB payments, spot rates are used to discount future GLLB payments to the present time. Below, various steps are discussed to calculate the spot rates.

Proceeding next to block 5022, the method calculates an expected earned rate for an asset as a function of maturity M, which is a sum of two summands, one being the treasury rate and the other being the asset spread rate. For comparison purposes, government-backed securities are selected that may be hypothetically used to determine the interest rates. The next step is to estimate the guarantor's expected annual yield earned on invested assets, which is the expected earned rate. This expected earned rate is based on the spread between the yield between a non-government backed asset and a government-backed asset of the same maturity ("asset spread"). This asset spread varies by the type of asset and the relative riskiness of the asset versus a government-backed investment. The expected asset spread changes over time and is provided externally by the guarantor's investment managers.

The method then calculates a crediting rate of maturity M, which is a remainder of a minuend, which is the expected earned rate of maturity M, and a subtrahend, which is a pricing margin. See block 5024. The pricing margin covers various risks and costs to the insurance company in issuing the policy and managing the risk. These risks include default risk, reinvestment risk, hedging costs, setup, and maintenance expenses.

Moving on to block 5026, the method calculates a weighted average (interpolation) of the closest available credited rates at other maturities to solve for a credited rate at maturity $M_j$. The method converts the credited rates at block 5028 to annual effective yields, consisting of a sum of two summands, one being a negative one and the other the square of two further summands. At block 5030, one further summand is a positive one and the other summand is a quotient of a dividend, which is the bond effective yield at maturity $M_j$, and a divisor, which is a positive two. Proceeding next to block 5032, the method converts the earned rates to spot rates for all maturities defining the rates that are used to calculate the present value of expected GLLB payments in future years, such as one year, two years, three years, thirty years, and so on. The method then continues to another continuation terminal ("Terminal A2").

From Terminal A2 (FIG. 5D), the method 5000 proceeds to block 5034 where each spot rate is mathematically configured to appear as a mathematical series. At block 5036, as one example, a one-year spot rate is equal to the one-year earned rate, defined as X. At block 5038, as another example, a two-year spot rate (Z) for the asset that earns Y rate is solved by a linear algebraic equation that equates the asset value to a sum of two summands. At block 5040, one of the summands is a product of two multiplicands, one multiplicand being the pledged asset value and the other being a quotient of Y, as a dividend, and (1+X) as a divisor. At block 5042, the other summand is a product of two multiplicands, one multiplicand being the pledged asset value and the other being a quotient of (1+Y), as a dividend, and squared (1+Z), as a divisor. At block 5044, as a further example, a three-year spot rate (V) for the asset that earns W rate is solved by a linear algebraic equation that equates the asset value to a sum of three summands. At block 5046, one of the summands is a product of the pledged asset value and a quotient of W, as a dividend, and (1+X), as a divisor. The method then continues to another continuation terminal ("Terminal A3").

From Terminal A3 (FIG. 5E), the method 5000 proceeds to block 5048 where another of the summands is a product of the pledged asset value and a quotient of W, as a dividend, and squared (1+Z), as a divisor. At block 5050, a further summand is a product of the asset value and a quotient of (1+W), as a dividend, and cubed (1+V), as a divisor. At block 5051, the determination of spot rates is repeated for the remaining maturity years from the fourth year to the last year the spot rate is specifically defined, such as 30.

At block 5052, to determine spot rates for years beyond the year in which the rate is specifically defined, the method calculates an ultimate rate, a defined number of years into the future, such as 40. At block 5054, each spot rate beyond the last specifically available spot rate year is an interpolation of the last specifically available spot rate and the ultimate rate. At block 5056, discount rates for years beyond the last specifically available spot rate year are calculated using forward rates, not the spot rates, which are defined as the expected one-year interest rate, X years from determination date. The method then continues to another continuation terminal ("Terminal A4").

From Terminal A4 (FIG. 5F), the method begins calculation for the mortality of the guarantee because the GLLB payments are payable only if the guarantee 102 is alive. The mortality when combined with the interest calculations previously discussed can be used as part of a calculation of the present value of GLLB payments if the guarantee 102 is alive at the end of each year. At block 5060, the method calculates $Q_{X,M}$, which is a probability that an X-year old guarantee 102 would die in the next year, M years beyond the effective date of a mortality table. The method 5000 then proceeds to another continuation terminal ("Terminal A5").

From Terminal A5 (FIG. 5G), the method begins calculating the probability of survival for the guarantee at block 5072. At block 5074, the method calculates $P_{X,M}$, which is a probability that the X-year old guarantee 102 lives through one year, M years beyond the effective date of the mortality table. At block 5076, $P_{X,M}$ is calculated as a sum of two summands, the first being a positive one and the second being the negative $Q_{X,M}$. At block 5078, for the probability that the X-year-old guarantee 102 lives for N years, M years beyond the effective date of the mortality table, a product of a number of multiplicands is calculated. At block 5080, such a probability is represented as $_NP_{X,M}$, which is equated to $(1-Q_{X,M})*(1-Q_{X+1,M+1})/(1-Q_{X+2,M+2})* \ldots *(1-Q_{X+N-1,M+N-1})$. At block 5082, using $_NP_{X,M}$, each probability can be used as a dividend for each respective term of a spot rate to determine the net present value of payments based on the credited rate to the guarantee.

At block 5084, the method begins to calculate expenses related to setting up and maintaining the GLLB. Setup expenses include the cost of entering the scheduled payments on a payout administration system. Setup expenses are assumed to occur once GLLB payments begin. Maintenance expenses include the cost of maintaining the payout administration system, sending ongoing guarantee statements, and processing guarantee requests (address changes, and so on). This expense is assumed to occur annually after the rider is issued. It is assumed that this expense may increase annually with inflation. The method 5000 then proceeds to another continuation terminal ("Terminal A6").

From Terminal A6 (FIG. 5H), the method 5000 proceeds to block 5086 where reserves are calculated as the remainder of the present value of expected GLLB payments (minuend) and the present value of the remaining GLLB rider charges to be paid (subtrahend). The guarantor is required to maintain investments of a certain amount in order to make future scheduled payments to various guarantees. That is, when a rider charge is received, a portion of it is retained by the guarantor to cover future scheduled benefits, while the remainder can be used to cover capital requirements, hedging costs, and adverse deviation.

At block 5088, for year T in a pricing horizon, such as 50 years, reserves are represented by reserve (T), as a function. At block 5090, reserve (T) is equated to $$[PAYMENT(1)*_1P_{X,M}/(1+I(1))+PAYMENT(2)*_2P_{X,M}/(1+I(2))^2+ \ldots +PAYMENT(50)_{50}P_{X,M}/(1+I(50))^{50}]-[FEE(1)*_1P_{X,M}/(1+I(1))+FEE(2)*_2P_{X,M}/(1+I(2))^2+\ldots+FEE(50)_{50}P_{X,M}/(1+I(50))^{50}]$$

At block 5092, I(T) as a function is the T-year reserving interest rate. FEE(T) is the fee that applies in year T, where fees would apply in a predetermined number of years, such as 10. PAYMENT(T) is the GLLB payment payable in year T, where T equals or exceeds the deferral period. At block 5094, the method calculates capital requirements using risk-based capital calculations. At block 5096, the method calculates the GLLB rider charges (the cost of the GLLB rider) to the guarantee while ensuring that the guarantor's capital requirements are met, hedging costs are covered, and adverse deviations are covered. The method then continues to another continuation terminal ("Terminal A7").

From Terminal A7 (FIG. 5I), at block 5176, the method calculates costs per $1000 of GLLB benefit. At block 5178, the method calculates annual GLLB costs to the guarantee based on the desired monthly GLLB payment, which is a product of three multiplicands, one of the multiplicands being 12. At block 5180, another multiplicand is the cost per $1000 of annual GLLB benefit (the benefit entered into the GLLB calculator by the guarantee) and the third multiplicand is the quotient of the desired monthly GLLB payment (dividend) and 1000 (divisor). The method 5000 proceeds to Terminal B.

From Terminal B (FIG. 5A), the method 5000 proceeds to a set of method steps 5004, defined between a continuation termination ("Terminal C") and another continuation terminal ("Terminal D"). The set of method steps 5004 describes, if necessary, the calculation of the reduced distribution of a guaranteed long-life benefit rider.

From Terminal C (FIG. 5P), the method 5000 proceeds to decision block 5182 where a test is performed to determine whether all GLLB rider charges were paid by the guarantee 102. If the answer is "yes" to the test at decision block 5182, the method continues to block 5184 where the desired GLLB payments distribution to the guarantee 102 will not be reduced. The method then continues to Terminal D. If, on the other hand, the answer to the test at decision block 5182 is "no," the method 5000 proceeds to block 5186 where the method begins to calculate a non-forfeiture amount in year T, which is a sum of three summands. One of the summands is a product of two multiplicands, and one of the multiplicands is the constant (1.03), reflecting a 3% credit accumulation. See block 5188. At block 5190, the second multiplicand is the non-forfeiture amount in year T–1 (recursive mathematic). The method then continues to another continuation terminal ("Terminal C1").

From Terminal C1 (FIG. 5Q), the method 5000 proceeds to block 5192 where the second summand is another product of two multiplicands, one multiplicand being the constant (0.875) reflecting a 12.5% reduction in the accumulated GLLB rider charge. At block 5194, the second multiplicand is the GLLB rider charge that was actually paid in year T. At block 5196, the last summand includes the constant (−50), which represents an allowance for GLLB benefit maintenance. At block 5198, the recursive mathematic unravels when the non-forfeiture amount is calculated for year zero, which is equal to zero. At block 5200, the reduced GLLB payment is calculated as a quotient of a dividend, which is the non-forfeiture amount for a length of the deferral period (D). At block 5202, the divisor is an annuitization factor, which is a function of the guarantee's current age (the age that GLLB payments begin) and gender. At block 5204, the function is implemented as a table with three columns, the first being age, the second being the annuitization value for male, and the third being the annuitization value for female. The method then continues to Terminal D.

From Terminal D, the method 5000 proceeds to a set of method steps 5006, defined between a continuation terminal ("Terminal E") and another continuation terminal ("Terminal F"). The set of method steps 5006 describes the calculation of non-qualified and qualified distributions of a guaranteed long-life benefit rider.

From Terminal E (FIG. 5R), the method 5000 proceeds to decision block 5206 where a test is performed to determine whether the GLLB rider is a non-qualified GLLB rider. If the answer to the test at decision block 5206 is "yes," the method continues to block 5208 where the desired GLLB payments distribution to the guarantee commences. The method then continues to Terminal F and terminates execution. If the answer to the test at decision block 5206 is "no," the method continues to another decision block 5210 where another test is performed to determine whether the distribution is a required minimum distribution (RMD) on the GLLB rider. If the answer to the test at decision block 5210 is "yes," the method continues to another continuation terminal ("Terminal E1"). If the answer to the test at decision block 5210 is "no," the method continues to another continuation terminal ("Terminal E5").

From Terminal E1 (FIG. 5S), the method 5000 proceeds to block 5212 where the method begins calculating the fair market value of the asset and the fair market value of the GLLB rider. At block 5214, a constraint is that the required minimum distribution in a new year is based on the fair market value of the asset and the GLLB rider on December 31 of the previous year. At block 5216, the fair market value of the asset is the asset itself. At block 5218, the fair market value of the GLLB rider is the price for a comparable annuity contract, which offers identical benefits to one at the same age as the guarantee 102 (as of December 31). At block 5220, the method begins calculating the required minimum distribution (as a quotient formed from a dividend and a divisor) at year T in which the required minimum distribution applies. At block 5222, the dividend is the summed fair values of the asset and the GLLB rider at year T. At block 5224, the divisor is the life expectancy of a person with age X as determined the Internal Revenue Service. The method then continues to another continuation terminal ("Terminal E2").

From Terminal E2 (FIG. 5T), the method 5000 proceeds to decision block 5226 where a test is performed to determine whether GLLB payments have commenced. If the answer to the test at decision block 5226 is "yes," the method continues to Terminal F and terminates execution. If, on the other hand, the answer to the test at decision block 5226 is "no," the method continues to another decision block 5228 where another test is performed to determine whether the asset is sufficient to allow the required minimum distribution. If the answer to the test at decision block 5228 is "yes," the method 5000 proceeds to block 5230 where the asset is used to make the required minimum distribution to the guarantee. The method then continues to Terminal F and terminates execution. If the answer to the test at decision block 5228 is "no," the method continues to another continuation terminal ("Terminal E3").

From Terminal E3 (FIG. 5U), the method 5000 proceeds to decision block 5232 where a test is performed to determine whether the guarantee is requesting the RMD to be taken from the GLLB rider. If the answer to the test at decision block 5232 is "no," the method continues to Terminal F and terminates execution. If the answer to the test at decision block 5232 is "yes," the method calculates a remainder at block 5234 (the actual distribution from the GLLB rider) from the RMD, as a minuend, and an amount coverable by the asset, as a subtrahend. At block 5236, the remainder is an amount that is covered by the GLLB rider to satisfy the RMD. At block 5238, the method calculates the adjusted GLLB payment amount which is a product of two multiplicands. The method then continues to another continuation terminal ("Terminal E4").

From Terminal E4 (FIG. 5V), the method 5000 proceeds to block 5240 where one multiplicand is a desired GLLB payment (as originally scheduled). At block 5242, the other multiplicand is a remainder of a minuend, which is a positive one, and a subtrahend, which is a quotient. At block 5244, the dividend of the quotient is the actual distribution from the GLLB rider, and the divisor is the fair market value attributed to the GLLB rider only. The method then continues to Terminal F and terminates execution. From Terminal E5 ("FIG. 5V), the method 5000 proceeds to block 5246 where the method begins to calculate RMD for a qualified deferred payout annuity to allow deferral of the annuity payment beyond age 70½. At block 5248, the method calculates the fair market value of the deferred payout annuity by looking at the guarantor's price for a comparable annuity contract as of December 31 of the year. The method then continues to another continuation terminal ("Terminal E6").

From Terminal E6 (FIG. 5W), the method calculates the RMD for year T as a quotient of a dividend and a divisor. See block 5250. At block 5252, the dividend is the fair market value of the deferred payout annuity at year T. At block 5254, the divisor is the life expectancy for a person with a current age of X as determined by the Internal Revenue Service. The method then continues to decision block 5256 where a test is performed to determine whether the guarantee is requesting the RMD to be taken from the deferred payout annuity. If the answer to the test at decision block 5256 is "no," the method continues to Terminal F and terminates execution. If the answer to the test at decision block 5256 is "yes," the method 5000 continues to another continuation terminal ("Terminal E7").

From Terminal E7 (FIG. 5X), the method calculates the adjusted annuity payment amount as a product of two multiplicands. See block 5258. At block 5260, one multiplicand is the original scheduled annuity payment amount. At block 5262, the other multiplicand is a remainder of a minuend, which is a positive one, and a subtrahend, which is a quotient. At block 5264, the dividend of the quotient is a positive one. The divisor of the quotient is the life expectancy for a person with a current age of X as determined by the Internal Revenue Service. See block 5266. The method then continues to Terminal F and terminates execution.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for distributing guaranteed long-life payments, comprising:
   using a calculator machinery to calculate rider charges to be charged to a guarantee based on specified guaranteed long-life payments, age, gender, and a deferral period desired by the guarantee;
   using a payment machinery to print checks or prepare electronic transfers for distributing the guaranteed long-life payments, whose distribution is separate from a distribution of a pledged asset, the act of distributing the guaranteed long-life payments commencing after a deferral period has passed, rider charges are paid by the guarantee, and the guarantee is still alive; and
   calculating a nonforfeiture amount in year T, which is a sum of three summands, one of the summands being a product of two multiplicands, one of the multiplicands being a first constant to reflect a fixed percentage of credit accumulation, a second multiplicand being a non forfeiture amount in year T−1, which defines a recursion.

2. The method of claim 1, further comprising calculating reduced guaranteed long-life payments for distribution if not all of the rider charges were paid by the guarantee.

3. The method of claim 2, further comprising calculating a second summand as another product of two multiplicands, one multiplicand being a second constant to reflect a percentage reduction in accumulated rider charges, a second multiplicand being a rider charge actually paid in year T.

4. The method of claim 3, further comprising calculating a last summand as a third constant which represents a charge for maintaining the distribution of guaranteed long-life payments, the recursion unraveling when the non-forfeiture amount is calculated for year zero.

5. The method of claim 4, wherein calculating reduced guaranteed long-life payments is calculated as a quotient of a dividend, which is a non-forfeiture amount for a length of a deferral period D, and a divisor, which is an annuitization factor as a function of the guarantee's current age, the length of the deferral period D, and the gender of the guarantee.

6. The method of claim 5, wherein the function is implemented as a table with three columns, the first being age, the second being the annuitization value for male, and the third being the annuitization for female.

7. A computer-readable medium having computer-executable instructions stored thereon for implementing a computer-executable method for distributing guaranteed long-life payments, comprising:
    using a calculator machinery to calculate rider charges to be charged to a guarantee based on specified guaranteed long-life payments, age, gender, and a deferral period desired by the guarantee;
    using a payment machinery to print checks or prepare electronic transfers for distributing the guaranteed long-life payments, whose distribution is separate from a distribution of a pledged asset, the act of distributing the guaranteed long-life payments commencing after a deferral period has passed, rider charges are paid by the guarantee, and the guarantee is still alive; and
    calculating a nonforfeiture amount in year T, which is a sum of three summands, one of the summands being a product of two multiplicands, one of the multiplicands being a first constant to reflect a fixed percentage of credit accumulation, a second multiplicand being a non forfeiture amount in year T−1, which defines a recursion.

8. The computer-readable medium of claim 7, further comprising calculating reduced guaranteed long-life payments for distribution if not all of the rider charges were paid by the guarantee.

9. The computer-readable medium of claim 8, further comprising calculating a second summand as another product of two multiplicands, one multiplicand being a second constant to reflect a percentage reduction in accumulated rider charges, a second multiplicand being a rider charge actually paid in year T.

10. The computer-readable medium of claim 9, further comprising calculating a last summand as a third constant which represents a charge for maintaining the distribution of guaranteed long-life payments, the recursion unraveling when the non-forfeiture amount is calculated for year zero.

11. The computer-readable medium of claim 10, wherein calculating reduced guaranteed long-life payments is calculated as a quotient of a dividend, which is a non-forfeiture amount for a length of a deferral period D, and a divisor, which is an annuitization factor as a function of the guarantee's current age, the length of the deferral period D, and the gender of the guarantee.

12. The computer-readable medium of claim 11, wherein the function is implemented as a table with three columns, the first being age, the second being the annuitization value for male, and the third being the annuitization for female.

* * * * *

UNITED STATES PATENT AND TRADEMARK OFFICE
CERTIFICATE OF CORRECTION

PATENT NO. : 8,103,529 B1  
APPLICATION NO. : 12/363616  
DATED : January 24, 2012  
INVENTOR(S) : J. B. Liebmann et al.

It is certified that error appears in the above-identified patent and that said Letters Patent is hereby corrected as shown below:

Title page  
Item (75)     Inventors     Insert after third inventor  
--; Amanda Jane Davis Gaberman, Mercer Island, WA (US)--

Signed and Sealed this  
Thirtieth Day of October, 2012

David J. Kappos  
*Director of the United States Patent and Trademark Office*